United States Patent
Cao et al.

(10) Patent No.: US 11,637,661 B2
(45) Date of Patent: *Apr. 25, 2023

(54) SYSTEM AND METHOD FOR TIME DOMAIN GRANT-FREE PUSCH RESOURCE ALLOCATION

(71) Applicant: Huawei Technologies Co., Ltd., Shenzhen (CN)

(72) Inventors: Yu Cao, Kanata (CA); Liqing Zhang, Ottawa (CA); Hua Xu, Ottawa (CA); Jianglei Ma, Ottawa (CA); Toufiqul Islam, Sunnyvale, CA (US); Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,090

(22) Filed: Jan. 22, 2021

(65) Prior Publication Data

US 2021/0144737 A1     May 13, 2021

Related U.S. Application Data

(63) Continuation of application No. 16/252,380, filed on Jan. 18, 2019, now Pat. No. 10,904,909.

(Continued)

(51) Int. Cl.
*H04W 72/12*     (2009.01)
*H04L 5/00*     (2006.01)
(Continued)

(52) U.S. Cl.
CPC .......... *H04L 1/1893* (2013.01); *H04L 5/0007* (2013.01); *H04L 5/0094* (2013.01);
(Continued)

(58) Field of Classification Search
CPC .......... H04W 72/1268; H04W 72/0446; H04L 5/0007; H04L 5/0094; H04L 1/00; H04L 27/2602
See application file for complete search history.

(56) References Cited

U.S. PATENT DOCUMENTS 8,503,389 B2    8/2013    Tamaka et al.
11,291,031 B2 *    3/2022    Bae .................. H04W 72/1284
(Continued)

FOREIGN PATENT DOCUMENTS

| | | |
|---|---|---|
| CN | 104885389 A | 9/2015 |
| CN | 106507486 A | 3/2017 |
| CN | 107005960 A | 8/2017 |

OTHER PUBLICATIONS

Cao, Y. et al., U.S. Appl. No. 62/447,437, "Systems and Methods for Signaling for Semi-Static Configuration in Grant-Free Uplink Transmissions", filed Jan. 17, 2017.

(Continued)

*Primary Examiner* — Rasheed Gidado
(74) *Attorney, Agent, or Firm* — Slater Matsil, LLP

(57) ABSTRACT

A user equipment (UE) may determine that a transmission resource includes a first orthogonal frequency-division multiplexing (OFDM) symbol that is configured as a downlink symbol or as flexible, where the transmission resource is allocated for uplink (UL) transmissions during a time duration, and includes K transmission occasions (TOs). The UE may transmit a first UL transmission in the transmission resource omitting the first OFDM symbol. The first UL transmission includes K repetitions to be transmitted in the respective K TOs, and the K repetitions includes an initial transmission and at least one retransmission of the initial transmission.

20 Claims, 18 Drawing Sheets

Related U.S. Application Data

(60) Provisional application No. 62/621,036, filed on Jan. 23, 2018.

(51) Int. Cl.

| | | |
|---|---|---|
| *H04L 27/26* | (2006.01) | |
| *H04W 72/04* | (2009.01) | |
| *H04L 1/1867* | (2023.01) | |
| *H04W 72/1268* | (2023.01) | |
| *H04W 72/0446* | (2023.01) | |
| *H04L 1/00* | (2006.01) | |

(52) U.S. Cl.
CPC ..... *H04L 27/2602* (2013.01); *H04W 72/0446* (2013.01); *H04W 72/1268* (2013.01); *H04L 1/00* (2013.01); *H04L 5/005* (2013.01); *H04L 5/0051* (2013.01); *H04L 5/0055* (2013.01)

(56) References Cited

U.S. PATENT DOCUMENTS

| | | | |
|---|---|---|---|
| 2003/0232622 A1* | 12/2003 | Seo | H04W 52/262 455/437 |
| 2015/0230210 A1* | 8/2015 | Lee | H04L 5/0007 370/329 |
| 2016/0353475 A1* | 12/2016 | Au | H04W 72/1289 |
| 2017/0034817 A1* | 2/2017 | Park | H04L 5/0082 |
| 2018/0124711 A1 | 5/2018 | Hosseini et al. | |
| 2018/0192419 A1* | 7/2018 | Yi | H04L 5/14 |
| 2018/0270848 A1 | 9/2018 | Liang et al. | |
| 2018/0332501 A1 | 11/2018 | Tseng et al. | |
| 2019/0190654 A1* | 6/2019 | You | H04L 5/0007 |
| 2019/0393988 A1* | 12/2019 | Bae | H04L 1/1893 |
| 2020/0059322 A1 | 2/2020 | Lei et al. | |
| 2020/0267803 A1* | 8/2020 | Kwak | H04L 5/0007 |

OTHER PUBLICATIONS

Islam, T. et al., U.S. Appl. No. 62/559,479, "Systems and Methods for Configuring Slot Formats with Multiple Switching Points Per Slot", filed Sep. 15, 2017.

MCC Support, "Final Report of 3GPP TSG RAN WG1 #90bis v1.0.0 (Prague, Czech Rep, Oct. 9-13, 2017)", 3GPP TSG RAN WG1 Meeting #91, R1-1719301, Nov. 27-Dec. 1, 2017, 206 pages, Reno, USA.

"UL data transmission procedure without UL grant", Huawei, HiSilicon, 3GPP TSG RAN WG1 Meeting #91, 1-1719411, 7.3.3.4, Nov. 27-Dec. 1, 2017, 14 pages, Dresden, Germany.

Vivo, "On UL data transmission procedure," 3GPP TSG RAN WG1 Meeting 91, R1-1719796, Nov. 27-Dec. 1, 2017, 12 pages, 7.3.3.4, Reno, USA.

Nokia et al., "On remaining issues for UL transmission without grant," 3GPP TSG-RAN WG1 Meeting 91, R1-1720481, Nov. 27-Dec. 1, 2017, 4 pages, 7.3.3.4, Reno, USA.

MCC Support, "Final Report of 3GPP TSG RAN WG1 #91 v1.0.0 (Reno, USA, Nov. 27-Dec. 1, 2017)", 3GPP TSG RAN WG1 Meeting #92, R1-1801301, Feb. 26-Mar. 2, 2018, 218 pages, Athens, Greece.

Huawei et al., "Summary of remaining issues on UL data transmission procedure", 3GPP TSG RAN WG1 NR Ad Hoc Meeting, R1-1800060, Jan. 22-26, 2018, 6 Pages, Vancouver, Canada.

Intel Corporation, "Remaining details and corrections on GC PDCCH", 3GPP TSG RAN WG1 Meeting AH 1801, R1-1800324, Jan. 22-26, 2018, 5 Pages, Vancouver, Canada.

Samsung, "Correction on Procedures for UL Transmissions", 3GPP TSG RAN WG1 Meeting AH 1801, R1-1800455, Jan. 22-26, 2018, 4 Pages, Vancouver, Canada.

Xiaomi, "UE behaviour when direction confliction between UL GF and dynamic SFI", 3GPP TSG RAN WG1 Meeting AH 1801, R1-1800780, Jan. 22-26, 2018, 4 Pages, Vancouver, Canada.

"3rd Generation Partnership Project; Technical Specification Group Radio Access Network; NR; Physical layer procedures for data, (Release 15)", 3GPP TS 38.214, V15.0.0, Technical Specification, Dec. 2017, 71 Pages.

* cited by examiner

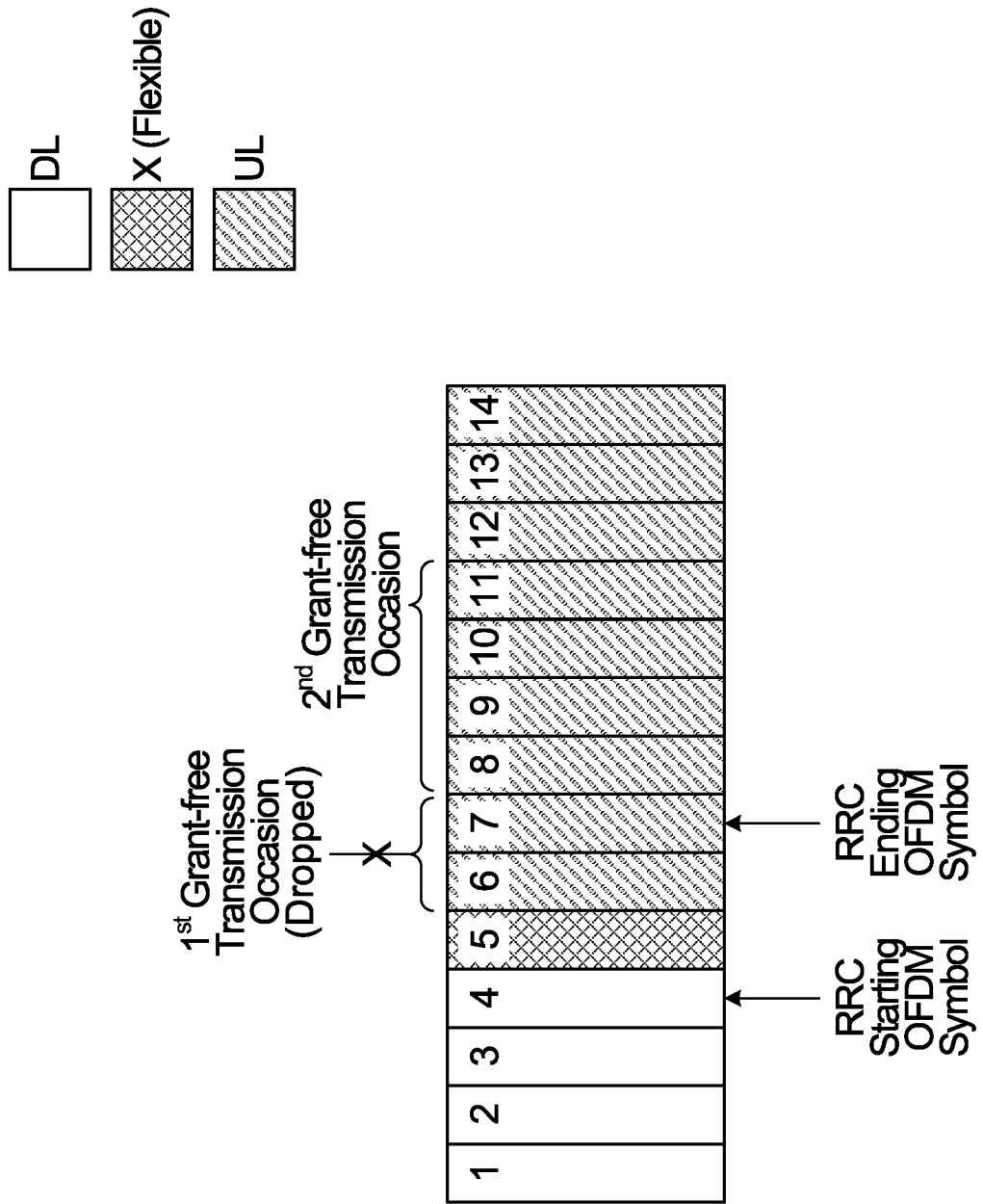

SYSTEM AND METHOD FOR TIME DOMAIN GRANT-FREE PUSCH RESOURCE ALLOCATION

CROSS-REFERENCE TO RELATED APPLICATIONS

This application is a Continuation of U.S. application Ser. No. 16/252,380, filed on Jan. 18, 2019, now U.S. Pat. No. 10,904,909 issued on Jan. 26, 2021, which claims the benefit of U.S. Provisional Application No. 62/621,036, filed on Jan. 23, 2018, which application is hereby incorporated herein by reference in its entirety.

TECHNICAL FIELD

The present disclosure relates generally to wireless communications, and in particular embodiments, to a system and method for time domain grant-free physical uplink shared channel (PUSCH) resource allocation.

BACKGROUND

In some wireless communication systems, an electronic device (ED), e.g. a user equipment (UE), wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free uplink transmission scheme in which UEs may send uplink transmissions using certain uplink resources shared by the UEs, without specifically requesting use of the resources and without specifically being granted the resources by the base station. The base station will therefore not know which UE, if any, is going to send a grant-free uplink transmission using the resources.

In an LTE grant-based transmission, the required transmission parameters are typically communicated via a Physical Uplink Control Channel (PUCCH) and/or Physical Downlink Control Channel (PDCCH). The base station is aware of the identity of the ED sending the uplink transmission using the granted uplink resources, because the base station specifically granted those uplink resources to that ED. In a grant-free transmission, different EDs may send uplink transmissions using uplink resources shared by the EDs, without specifically requesting use of the resources and without specifically being granted the resources by the base station. One advantage of grant-free transmission is low latency resulting from not having to request and receive a grant for an allocated time slot from the base station. Furthermore, in a grant-free transmission, the scheduling overhead may be reduced. However, the base station does not have information which ED, if any, is sending a grant-free uplink transmission at a particular moment of time, which may require blind detection of grant-free transmissions received at the base station. In other words, the base station is required to determine which ED is transmitting.

SUMMARY

Technical advantages are generally achieved by embodiments of this disclosure which describe a system and method for time domain grant-free physical uplink shared channel (PUSCH) resource allocation.

In accordance with one aspect of the present disclosure, a method is provided for wireless communications. The method includes determining, by a user equipment (UE), that a transmission resource includes a first orthogonal frequency-division multiplexing (OFDM) symbol that is configured as a downlink symbol or as flexible, where the transmission resource is allocated for uplink (UL) transmissions during a time duration, and includes K transmission occasions (TOs), and K is an integer greater than L The method further includes transmitting, by the UE, a first UL transmission in the transmission resource omitting the first OFDM symbol. The first UL transmission includes K repetitions to be transmitted in the respective K TOs, and the K repetitions include an initial transmission and at least one retransmission of the initial transmission.

Optionally, in any of the preceding aspects, the first OFDM symbol is semi-statically configured for a downlink (DL) transmission.

Optionally, in any of the preceding aspects, the first OFDM symbol is semi-statically configured as flexible and dynamically configured as flexible.

Optionally, in any of the preceding aspects, the first OFDM symbol is semi-statically configured as flexible and dynamically configured for DL transmission.

Optionally, in any of the preceding aspects, the first OFDM symbol is semi-statically configured by a higher-layer parameter comprising a time division duplex (TDD) UL-DL configuration common parameter or TDD UL-DL configuration dedicated parameter.

Optionally, in any of the preceding aspects, the K TOs are located in K respective slots.

Optionally, in any of the preceding aspects, transmitting the first UL transmission in the transmission resource omitting the first OFDM symbol comprises transmitting, by the UE, the first UL transmission in the transmission resource omitting a first TO of the K TOs that comprises the first OFDM symbol.

Optionally, in any of the preceding aspects, the first TO is omitted upon determining that the first TO has less than a threshold number of OFDM symbols that are available for UL transmissions.

Optionally, in any of the preceding aspects, the first TO is omitted upon determining that the first TO is not configured for the initial transmission.

Optionally, in any of the preceding aspects, the first TO is omitted upon determining that the first TO is not associated with a specific redundant version (RV) index.

Optionally, in any of the preceding aspects, transmitting the first UL transmission in the transmission resource omitting the first TO comprises transmitting, by the UE in a second TO that is subsequent to the first TO comprising the first OFDM symbol, a first repetition of the K repetitions that is corresponding to the first TO.

Optionally, in any of the preceding aspects, the first TO and the second TO are in different slots.

Optionally, in any of the preceding aspects, transmitting the first UL transmission in the transmission resource omitting the first TO comprises transmitting, by the UE, less than K repetitions in the transmission resource during the time duration.

Optionally, in any of the preceding aspects, the method further includes re-mapping a redundant version (RV) sequence associated with the K TOs to the less than K repetitions, the RV sequence comprising a plurality of RV indices.

Optionally, in any of the preceding aspects, transmitting the first UL transmission in the transmission resource omitting the first TO comprises transmitting, by the UE, the K repetitions during the time duration, at least one repetition being transmitted in an OFDM symbol that is subsequent to the K TOs.

Optionally, in any of the preceding aspects, transmitting the first UL transmission in the transmission resource omitting the first OFDM symbol comprises transmitting, by the UE, a repetition in OFDM symbols of a first TO that comprises the first OFDM symbol, omitting the first OFDM symbol.

Optionally, in any of the preceding aspects, the method further includes puncturing, by the UE, the repetition for transmitting the repetition in the OFDM symbols of the first TO.

Optionally, in any of the preceding aspects, the method further includes performing, by the UE, rate matching on the repetition for transmitting the repetition in the OFDM symbols of the first TO.

Optionally, in any of the preceding aspects, transmitting the repetition further comprises transmitting, by the UE, the repetition in a set of OFDM symbols subsequent to the first OFDM symbol, the set of OFDM symbols being available for UL transmissions.

Optionally, in any of the preceding aspects, the set of OFDM symbols comprises consecutive OFDM symbols.

Optionally, in any of the preceding aspects, the K TOs are associated with a redundant version (RV) sequence comprising a plurality of RV indices, each TO being mapped to a RV index of the plurality of RV indices.

In accordance with another aspect of the present disclosure, a user equipment (UE) is provided, which includes a non-transitory memory storage comprising instructions; and one or more processors in communication with the memory storage. The one or more processors execute the instructions to determine that a transmission resource includes a first orthogonal frequency-division multiplexing (OFDM) symbol that is configured as a downlink symbol or as flexible, wherein the transmission resource is allocated for uplink (UL) transmissions during a time duration, and comprises K transmission occasions (TOs), K being an integer greater than 1; and transmit a first UL transmission in the transmission resource omitting the first OFDM symbol. The first UL transmission comprises K repetitions to be transmitted in the respective K TOs, and the K repetitions comprises an initial transmission and at least one retransmission of the initial transmission.

Optionally, in any of the preceding aspects, the first OFDM symbol is semi-statically configured for downlink (DL) transmission.

Optionally, in any of the preceding aspects, the first OFDM symbol is semi-statically configured as flexible and dynamically configured as flexible.

Optionally, in any of the preceding aspects, the first OFDM symbol is semi-statically configured as flexible and dynamically configured for DL transmission.

Optionally, in any of the preceding aspects, the first OFDM symbol is semi-statically configured by a higher-layer parameter comprising a time division duplex (TDD) UL-DL configuration common parameter or TDD UL-DL configuration dedicated parameter.

BRIEF DESCRIPTION OF THE DRAWINGS

For a more complete understanding of the present disclosure, and the advantages thereof, reference is now made to the following description taken in conjunction with the accompanying drawings, in which:

FIG. 9 illustrates another example of a mini-slot based grant-free resource occasion allocation at the OFDM symbol level to avoid conflict of resources;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In this disclosure, grant-free transmissions refer to data transmissions that are performed without communicating grant-based signaling in a dynamic control channel, such as a Physical Uplink Control Channel (PUCCH) or a Physical Downlink Control Channel (PDCCH). Grant-free transmissions can include uplink (UL) or downlink (DL) transmissions, and should be interpreted as such unless otherwise specified. Grant-free uplink transmissions are sometimes called "grant-less", "schedule free", or "schedule-less" transmissions. Grant-free uplink transmission can also be referred to as "UL transmission without grant", "UL transmission without dynamic grant", "transmission without dynamic scheduling", "transmission using configured grant". Sometimes, grant-free resources configured in RRC without DCI signaling may be called a radio resource control (RRC) configured grant (also referred to as Type 1). Grant-free resource configured using both RRC and downlink control information (DCI) signaling may also be a configured grant, a DCI configured grant or another type of configured grant (sometime referred to as Type 2).

An UL transmission performed in grant-free resources configured in accordance with Type 1 may be referred to as Type 1 grant-free transmission. An UL transmission performed in grant-free resources configured in accordance with Type 2 may be referred to as Type 2 grant-free transmission.

Figure 1:
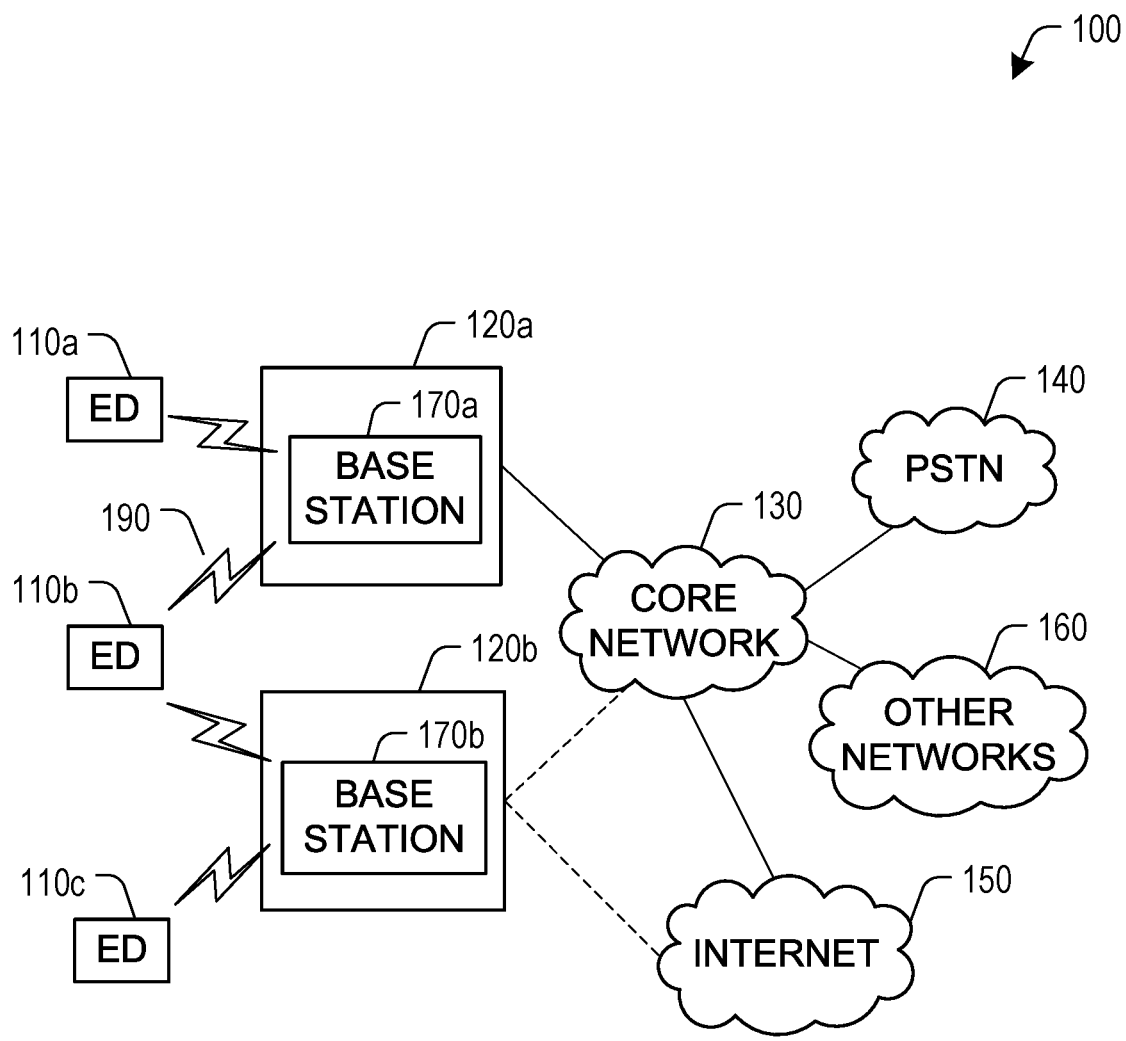
FIG. 1 is a schematic diagram of a communication system.

FIG. 1 illustrates an example communication system 100 in which embodiments of the present disclosure could be implemented. In general, the system 100 enables multiple wireless or wired user devices to transmit and receive data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (EDs) 110a-110c, radio access networks (RANs) 120a-120b, a core network 130, a public switched telephone network (PSTN) 40, the Internet 150, and other networks 160. Although certain numbers of these components or elements are shown in FIG. 1, any reasonable number of these components or elements may be included in the system 100.

The EDs 110a-110c are configured to operate, communicate, or both, in the system 100. For example, the EDs 10a-10c are configured to transmit, receive, or both, via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 17a-170b may include (or be) one or more of several well-known devices, such as a base transceiver station (BTS), a Node-B (NodeB), an evolved NodeB (eNodeB), a Home NodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160 or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links. e.g., radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802-15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with voice, data and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs 110a-110c may communicate via wired communication channels to a service provider or switch (not shown), and to the internet 150. PSTN 140 may include circuit switched telephone networks for providing plain old telephone service (POTS). Internet 150 may include a network of computers or subnets (intranets) or both, and incorporate protocols, such as IP, TCP, or UDP. EDs 110a-110c may be multimode devices capable of operation according to multiple radio access technologies, and incorporate multiple transceivers necessary to support such.

Although FIG. 1 illustrates one example of a communication system, various changes may be made to FIG. 1. For example, the communication system 100 could include any number of EDs, base stations, networks, or other components in any suitable configuration.

Figure 2A:
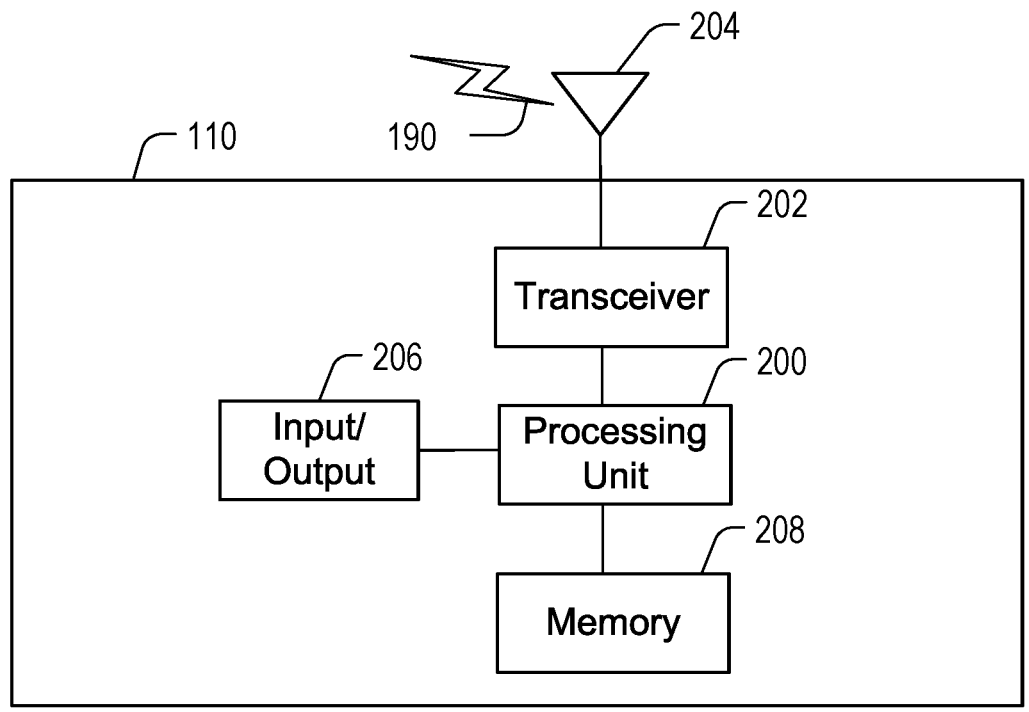
FIG. 2A illustrates a diagram of an embodiment electronic device (ED) such as a user equipment (UE)
Figure 2B:
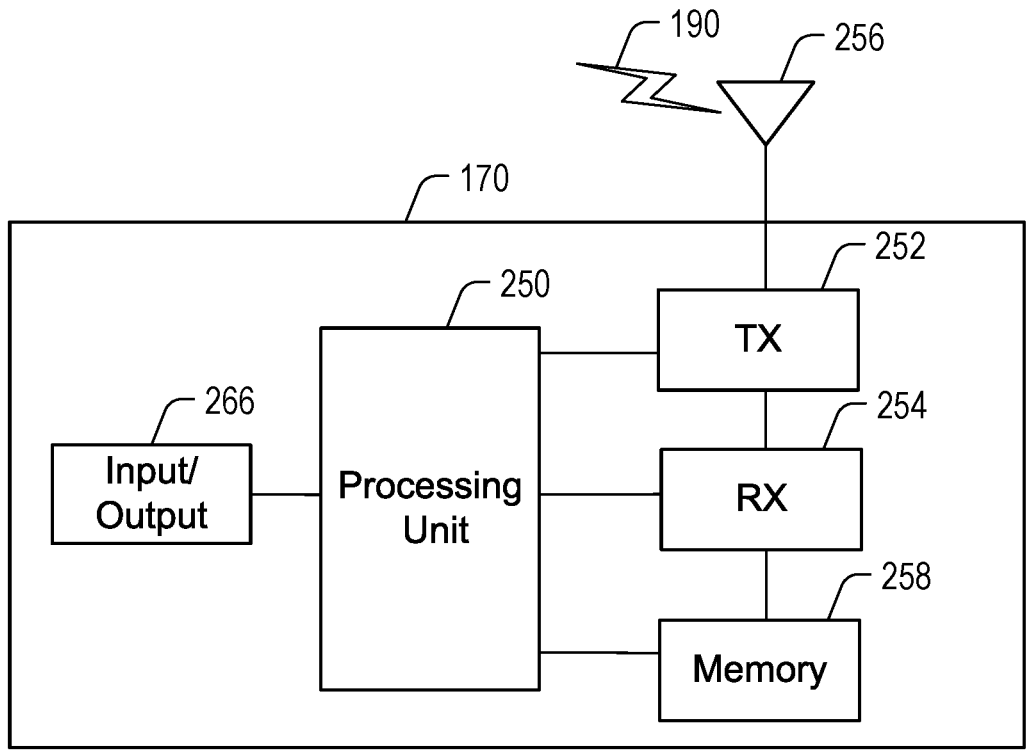
FIG. 2B illustrates a diagram of an embodiment base station.

FIGS. 2A and 2B illustrate example devices that may implement the methods and teachings according to this disclosure. In particular, FIG. 2A illustrates an example ED 110 corresponding to 110a, 110b, 110c, and FIG. 2B illustrates an example base station 170 corresponding to 170a or 170b. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 also supports the methods and teachings described in more detail above and below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or NIC (Network Interface Controller). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110 One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler may also be coupled to the processing unit 250. The scheduler may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate transmitter 252 and receiver 254, these two devices could be combined as a transceiver. Each antenna 256 includes any suitable structure for transmitting and/or receiving wireless or wired signals. While a common antenna 256 is shown here as being coupled to the transmitter 252, one or more antennas 256 could be coupled to the receiver 254, allowing separate antennas 256 to be coupled to the transmitter and the receiver as separate components. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices (network communications) in the network. Each input/output device 266 includes any suitable structure for providing information to or receiving/providing information from a user, including network interface communications.

Grant-Free Transmissions

The base stations 170 are configured to support wireless communication with EDs 110, which may each send grant-free uplink transmissions. Uplink transmissions from the EDs 110 are performed on a set of time-frequency resources. A grant-free uplink transmission is an uplink transmission that is sent using uplink resources without the base stations 170 dynamically allocating resources to request/grant mechanisms. By performing grant-free transmissions, total network overhead resources may be saved. Furthermore, time savings may be provided by bypassing the request/grant procedure. An ED sending a grant-free uplink transmission, or configured to send a grant-free uplink transmission, may be referred to as operating in grant-free mode. Grant-free uplink transmissions are sometimes called "grant-less", "schedule free", or "schedule-less" transmissions. Grant-free uplink transmissions from different EDs may be transmitted using shared designated resource units, in which case the grant-free uplink transmissions are contention-based transmissions. One or more base stations 170 may perform blind detection of the grant-free uplink transmissions.

In a wireless network according to an embodiment, any ED can be configured for grant-based or grant-free transmissions depending on, e.g., the application and device types and requirements. Usually, a grant-free transmission may require resource (pre-) configuration at the ED connection setup and have resource reconfiguration or an update during operation. In some embodiments, the grant-free resources can be configured for EDs by broadcast or multicast signaling in some scenarios. Two or more grant-free transmissions can share the same configured resources. Furthermore, a grant-based transmission can use dedicated resources or can share resources (fully or partially) with grant-free resources in a time interval.

Any of the grant-free and grant-based transmissions can be used for any application traffic or services type, depending on the associated application requirements and quality of service (QoS). By way of a non-limiting example, grant-free transmission can be used for: ultra-reliable low latency communication (URLLC) traffic to satisfy the low latency requirement; enhanced mobile broadband (eMBB) traffic with short packets to save signaling overhead; URLLC traffic having low latency requirements; and eMBB traffic to dynamically take advantage of link adaptation and enhance resource utilization and spectrum efficiency.

One ED or a group of EDs may have a group ID or a Radio Network Temporary ID (RNTI; e.g., grant-free (GF)-RNTI or grant-based (GB) RNTI) to share the same parameter or resource configuration. The group ID can be pre-configured, or dynamically configured to each ED. The parameter or resource configuration to the ED(s) with the group ID can be done by semi-static or dynamic signaling. In some embodiments, the group ID can be used for, e.g., resource deactivation or activation for the EDs in the group. By way of a non-limiting example, the resources being activated or deactivated can include frequency, time, and a reference signal (RS) associated with each ED in the group.

Grant-Free Resource Structure

To support grant-free transmissions, the associated resources configured for an ED or a group of EDs can include any or all of the following:

1) Frequency resources in a transmission time interval (TI), e.g. a symbol, mini-slot or slot. In one example, a physical resource block (PRB) scheme is provided. The PRB scheme indicates a physical starting frequency resource block (RB) and a size of the RB.

2) Time resources, including starting/ending position of one data transmission time interval. For example, a TTI can be one symbol, mini-slot, or slot.

3) Reference signal (RS) configurations, where each ED can be configured with one or more reference signals (RSs), e.g. demodulation reference signals (DMRSs) depending on scenarios involved. For a group of EDs, each ED may or may not have a different RS or have a different set of RSs. Note that different RSs can be orthogonal or non-orthogonal to each other depending on an application, e.g., such as a URLLC application or a massive machine-type communication (mMTC) application.

4) ED/ED group specific hopping parameters, which may include one of the following two parameters. One parameter may include a hopping pattern cycle period. In one embodiment, an absolute reference duration (e.g., 20 TTIs before repeating itself) is defined. During the absolute reference duration, the number of hopping steps (e.g., 10 times) to take before repeating the hopping pattern again can be determined based on periodicity of time interval resource accessible for grant-free transmissions (e.g., 2 TTIs). In another embodiment, an absolute number of hopping times can be defined, for example hopping 20 times before repeating itself. Other parameter(s) may include a hopping pattern index or indices, where one ED may have one or more hopping pattern indices.

5) One or more hybrid automatic repeat request (HARQ) process IDs per ED.

6) One or more modulation and coding schemes (MCSs) per ED, where a grant-free ED can indicate explicitly or implicitly which MCS to use for a transmission 7) Number of grant-free transmission repetitions K, one or more K values can be configured for an ED, where which K value to use depends on certain rule taking into account ED channel conditions, service types, etc.

8) Power control parameters, including power ramping step size (e.g., for an ED).

9) Other parameters, including information associated with general grant-based data and control transmissions. Note that sometimes, a subset of grant-free resources can be referred to as "fixed" or "reserved" resources; whereas a subset of grant-based resources can be referred to as "flexible" resources, which can be dynamically scheduled by a base station.

Hybrid Automatic Repeat Requests

As discussed above, the ED 110 may be configured to use a particular set of resources for grant-free transmission. A collision may occur when two or more of the EDs 110 attempt to transmit data on a same set of uplink resources. To mitigate possible collisions, the EDs 110 may use retransmissions. A retransmission, without grant, of an original grant-free uplink transmission is referred to herein as a "grant-free retransmission". Any discussion of a grant-free retransmission herein should be understood to refer to either a first or a subsequent retransmission. Herein, the term "retransmission" includes both simple repetitions of the transmitted data, as well as retransmissions using an asynchronous hybrid automatic repeat request (HARQ), that is, a combination of high-rate forward error-correcting coding and physical layer automatic repeat request (ARQ) error control.

In an embodiment, a number of automatic grant-free retransmissions may be pre-configured, to improve reliability and eliminate latency associated with waiting for an acknowledgement (ACK) or a negative acknowledgement (NACK) message. The retransmissions may be performed by the ED 110 until at least one of the following conditions is met:

1) An ACK message is received from the base station 170 indicating that the base station 170 has successfully received and decoded a transport block (TB). The ACK may be sent in a dedicated downlink acknowledgement channel, sent as individual DCI, sent in a data channel, sent as part of a group ACK/NACK, etc.

2) The number of repetitions reaches K. In other words, if the ED 110 has performed K retransmissions and an ACK is still not received from the base station 170, then the ED 110 gives up trying to send the data to the base station 170. In some embodiments, K is semi-statically configured by the base station 170, such that the base station 170 or the network can adjust K over time.

3) A grant is received from the base station 170 performing a grant-free to grant-based switch.

In an embodiment, the grant-free retransmission may be triggered by receiving a negative acknowledgment (NACK) message, or failing to receive an acknowledgment (ACK) message. In an alternative embodiment, K grant-free retransmissions are performed irrespective of the response from the base station 170.

The resources over which the one or more grant-free retransmissions are performed may be pre-configured, in which case the base station determines the resources based on a priori information. Alternatively, the resources over which the grant-free initial transmission or one or more retransmissions are performed may be determined e.g. according to an identifier in a pilot signal of the original grant-free uplink transmission. This may allow the base station to predict, or otherwise identify, which uplink resources will carry the one or more retransmissions upon detecting the identifier in the pilot symbol.

Grant-free transmission reduces latency and control overhead associated with grant-based procedures, and can allow for more retransmissions/repetitions to increase reliability. However, due to the lack of uplink scheduling and grant signaling, grant-free EDs may have to be pre-configured to use a fixed modulation and coding scheme (MCS) level at least for initial grant-free transmission. In one embodiment, grant-free EDs are configured to use the most reliable MCS level for a given resource unit for grant-free uplink transmissions.

Figure 2C:
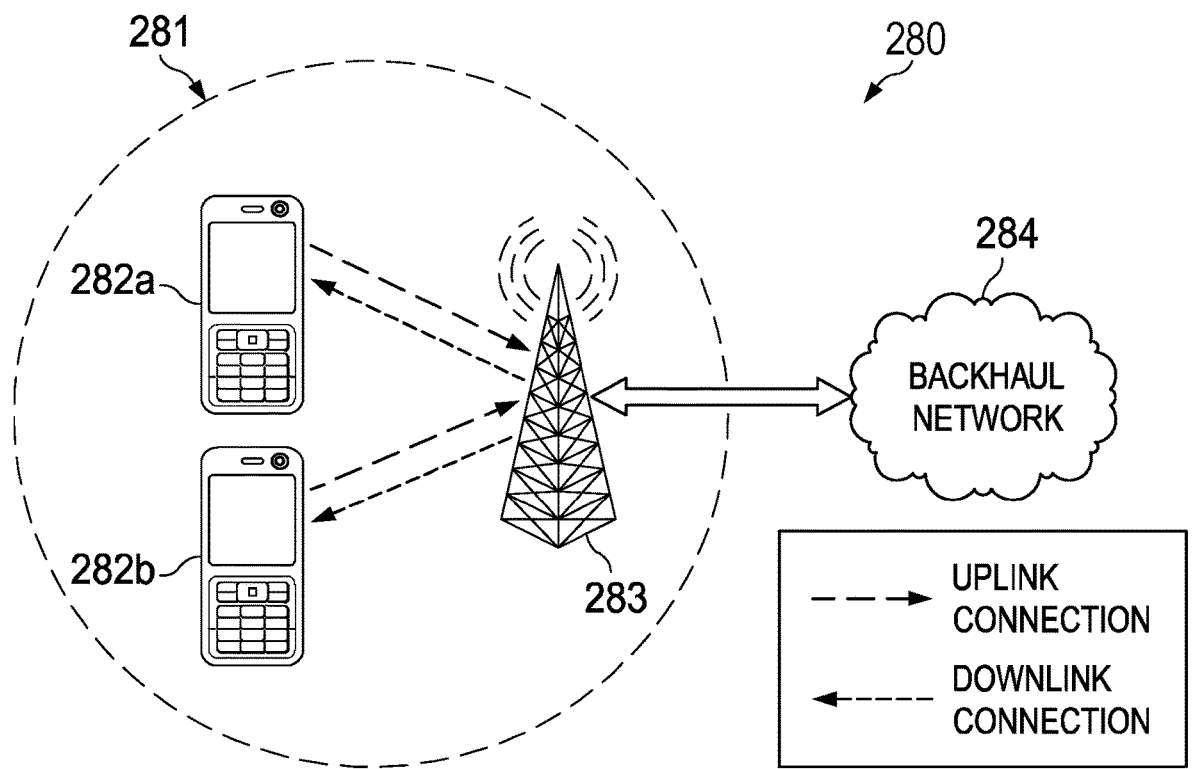
FIG. 2C illustrates a network for communicating data.

FIG. 2C illustrates an example network 280 for communicating data. The network 280 comprises a Base Station (BS) 283 having a coverage area 281, a plurality of mobile devices 282 (282a, 282b), and a backhaul network 284. As shown, the base station 283 establishes uplink (long dashed line) and/or downlink (short dashed line) connections with the mobile devices 282, which serve to carry data from the mobile devices 282 to the BS 283 and vice-versa. Data carried over the uplink/downlink connections may include data communicated between the mobile devices 282, as well as data communicated to/from a remote-end (not shown) by way of the backhaul network 284.

The network 280 may implement a grant-free uplink transmission. Grant-free uplink transmissions from different mobile devices may be transmitted using the same designated resources in which case the grant-free uplink transmissions may support contention-based transmissions. One or more base stations, e.g. BS 283, may perform blind detection on the grant-free uplink transmissions.

Grant-free uplink transmissions may be suitable for transmitting bursty traffic with short packets from the mobile devices 282 to the BS 283, and/or for transmitting data to the BS 283 in real-time or with low-latency. Examples of applications in which a grant-free uplink transmission scheme may be utilized include: massive machine type communication (m-MTC), ultra-reliable low latency communications (URLLC), smart electric meters, tele-protection in smart grids, and autonomous driving. However, grant-free uplink transmission schemes are not limited to the applications described above.

The BS 283 may implement a grant-free uplink transmission scheme, and designated grant-free regions may be defined so that the mobile devices 282 may contend for and access uplink resources without a request/grant mechanism. The grant-free uplink transmission scheme may be defined by the BS, or it may be set in a wireless standard (e.g., 3GPP). Mobile devices 282 may be mapped to various designated grant-free regions to avoid collision (i.e., when two or more mobile devices attempt to transmit data on the same uplink resource). However, if collision occurs, the mobile devices 282 may resolve collisions using an asynchronous HARQ (hybrid automatic repeat request) method. The BS 283 may blindly (i.e., without explicit signaling) detect active mobile devices and decodes received uplink transmissions.

Under this scheme, the mobile devices 282 may send uplink transmissions without the BS 283 allocating resources according to request/grant mechanisms. Therefore, total network overhead resources may be saved. Furthermore, this system may allow for time savings during uplink by bypassing the request/grant scheme. Although only one BS 283 and two mobile devices 282 are illustrated in FIG. 2C, a typical network may include multiple BSs each covering transmissions from a varying multitude of mobile devices in its geographic coverage area.

The network 280 uses various high level signaling mechanisms to enable and configure grant-free transmissions. The mobile devices 282 capable of grant-free transmissions may signal this capability to the BS 283. This may allow the BS 283 to support both grant-free transmissions and traditional signal/grant transmissions (e.g., for older mobile device models) simultaneously. The relevant mobile devices may signal this capability by, for example, RRC (radio resource control) signaling defined in the 3GPP (third generation partnership project) standard. A new field may be added to the mobile device capability list in RRC signaling to indicate whether the mobile device supports grant-free transmissions. Alternatively, one or more existing fields may be modified or inferred from in order to indicate grant-free support.

The BS 283 may also use high-level mechanisms (e.g., a broadcast channel or a slow signaling channel) to notify the mobile devices 282 of information necessary to enable and configure a grant-free transmission scheme. For example, the BS 283 may signal that it supports grant-free transmissions, a search space location (defining a time-frequency resource) and access codes for designated grant-free access regions, a maximum size of a signature set (i.e., the total number of signatures defined), a modulation and coding scheme (MCS) setting, and the like. Furthermore, the BS 283 may update this information from time to time using, for example, a slow signaling channel (e.g., a signaling channel that only occurs in the order of hundreds of milliseconds instead of occurring in every transmit time interval (TT)).

A network or a BS may update the amount of grant-free resources according to traffic load, number of UEs, RS resources, and/or physical resources. The grant-free resources may include several predefined patterns, and each pattern may represent a certain amount of grant-free resources assigned among all the resource with fixed pattern(s). In an embodiment, the grant-free resource configuration and update may only indicate an index of the pattern used. The BS may notify UEs of the update of grant-free resource assignment through system information, a broadcast channel, and/or a common control channel.

When grant-free resources increase or decrease, the sequence may be punctured to maintain the controlled collision UE grouping and collision free RS assignment without signaling to individual UEs. After reducing the grant-free resources to half, the number of opportunities may be reduced in half, but the number of max collisions and RS resource requirements may remain the same.

Semi-Static and Dynamic UL-DL Transmission Direction Configuration

The New Radio (NR) telecommunication protocol is expected to support both dynamic and semi-static UL-DL transmission direction configuration indication. The direction indication is for configuration of transmission resources in a UL or DL direction. Semi-static is defined in comparison with the dynamic option that is operating in every time slot. For example, semi-static can mean periodically within a given time period, such as, for example, 200 or longer time slots. Semi-static can also means configuring it once and only update once in a while. Sometimes semi-static configuration refers to a case where the signaling of the configuration is not in a dynamic signaling, e.g., the signaling can be in broadcast signaling, RRC signaling, higher layer signaling, or a non-DCI signaling. Communications between the network and UEs may be based on slots. Such slots are based on time division duplexing (TDD), with uplink transmissions occurring at times that are distinct from downlink transmission. In a specific example, each slot has 14 OFDM symbols. A slot may include one or a combination of: downlink (DL) symbols; uplink (UL) symbols; guard symbols; and flexible, unknown or reserved symbols.

Alternatively, a slot may include one or a combination of DL symbols, UL symbols, and other symbols that are neither DL nor UL symbols for a particular UE, i.e., no transmission to and from the UE takes place on those symbols. The other symbols may be called "flexible" or "unknown" in general from a perspective of UEs that are receiving the information. One or more of the indicated "flexible" or "Unknown" symbols may serve the purpose of guard period or gap between DL and UL symbol(s), i.e., there may not be any "guard" symbol(s) identified in a slot, instead, some symbols can be called "flexible" or "unknown" generally, one or more of which can be used as gap or can be overridden as DL or UL symbols by other dynamic signaling. To this end, a slot may include one or a combination of: downlink (DL) symbols; uplink (UL) symbols; and flexible or unknown symbols.

A user equipment (UE) can be semi-statically configured by higher layer signaling, such as a system information block (SIB) or radio resource control (RRC) signaling that indicates the allocation of UL and DL symbols for different slots. Examples of such a higher layer signaling may include TDD UL-DL configuration, UL-DL-configuration-common (also known as TDD UL-DL configuration common) and UL-DL-configuration-dedicated (also known as TDD UL-DL configuration dedicated). This type of semi-static configuration can be periodic. A semi-static UL-DL transmission direction configuration provides a slot format per slot over a number of slots. The configuration may be repeated over different periods. The UE considers symbols in a slot indicated as downlink by the semi-static UL-DL transmission direction configuration (e.g. by a higher layer parameter UL-DL-configuration-common or by a higher layer parameter UL-DL-configuration-dedicated) as available for reception. The UE considers symbols in a slot indicated as uplink by a semi-static UL-DL transmission direction configuration (i.e. a higher layer parameter UL-DL-configuration-common or by a higher layer parameter UL-DL-configuration-dedicated) as available for transmission. The UL-DL-configuration-dedicated may only be able to override the flexible symbol indicated in UL-DL-configuration-common. In some embodiments, a grant-free enabled UE can detect dynamic slot format indication (SFI) and follow both dynamic and semi-static UL-DL configuration.

For example, a UE may be semi-statically configured using higher layer signaling including configurations such as a TDD UL-DL configuration, UL-DL-configuration-common (also known as TDD UL-DL configuration common) or UL-DL-configuration-dedicated (also known as TDD UL-DL configuration dedicated). The UL-DL-configuration-common is a common configuration to multiple users, and the UL-DL-configuration-dedicated is a UE specific configuration. The UE may be semi-statically configured using a higher layer signaling parameter, such as a UL-DL-configuration-common parameter, or a UL-DL-configuration-dedicated parameter.

The semi-static UL-DL configuration may define each OFDM symbol of each slot to be either "downlink" (DL), "flexible" (may subsequently be allocated for either DL or UL), or "uplink" (UL). Defining each OFDM symbol being either DL, flexible or UL symbol may be referred in this disclosure as slot format or slot format information. A slot format indicates a combination of one or more of:

which symbols (i.e. location within the slot) are downlink symbols;

which symbols are uplink symbols;

which symbols are flexible or unknown or reserved symbols.

A DL symbol refers to a symbol that is used for DL transmission, while a UL symbol refers to a symbol that is used for UL transmission. A symbol that is configured as DL in a semi-static UL-DL configuration cannot be used for UL GF transmissions, and therefore it may be consider as a conflict if the same symbol is also configured for UL GF transmission. In some embodiments, a flexible symbol can be used for UL GF transmission, i.e., the configured UL GF transmission on the symbol overrides the transmission direction of the symbol from "flexible" to "UL", and it is not considered as a conflict. In some embodiments, the flexible symbol cannot be used for UL GF transmission without being overridden by dynamic SFI to UL transmission.

In order to facilitate dynamically changing the slot format, i.e. dynamically adjusting how the slot is subdivided as between uplink and downlink transmissions, a slot format indication (SFI) can be transmitted from a network to a group of UEs. A UE may be further indicated for UL-DL configuration of a slot by a dynamic SFI. A dynamic SFI is typically indicated using a group common Physical Downlink Control Channel (GC-PDCCH). A dynamic SFI can indicate the UL-DL configuration of a slot format for a slot or a group of slots. A UE may be configured whether to monitor a dynamic SFI and/or how often to monitor the dynamic SFI (e.g. the UE may be configured with a SFI monitoring periodicity). A dynamic SFI may override the transmission direction of a flexible symbol that is configured in semi-static UL-DL configuration. If a SFI is received that overrides a flexible symbol to a DL symbol or a flexible/unknown symbol, the overridden symbol may not be available for UL grant-free transmission, i.e., if a grant-free transmission is configured on that symbol, it cannot be transmitted on that symbol.

The UL/DL transmission direction configuration may also be configured to monitor a combination of semi-static UL-DL configuration and dynamic configuration using a slot format indication (SFI). In some embodiments, an SFI may be transmitted on a group common Physical Downlink Control Channel (GC-PDCCH). The SFI may indicate the slot format information for an OFDM symbol, slot, or group of slots. For example, an OFDM symbol in a slot may be allocated for "downlink" (DL), "flexible" (may subsequently be allocated for either DL or UL), or "uplink" (UL).

Grant-Free Resource Configuration

NR is also expected to support UL transmission resource allocation on the basis of a slot, where a slot includes a plurality of orthogonal frequency divisional multiplexed (OFDM) symbols, and a mini-slot, where a mini-slot is a set of OFDM symbols that is less than the size of a slot. For example, a slot may include 14 OFDM symbols. A mini-slot within the slot may be comprised of 2 OFDM symbols, 4 OFDM symbols or 7 OFDM symbols. In NR, a downlink control indication (DCI) message may be used to define resource allocation on a slot, mini-slot, or symbol basis.

A transmission occasion (TO) in the disclosure may refer to a transmission resource, which includes at least the resource in the time domain. Specifically, a TO may include indication of a period of time during which transmission is performed. In some embodiments, the time domain property of TO may be represented in terms of OFDM symbols or slots. For example, a TO may include one or more OFDM symbols. The terms of "transmission occasion", and "transmission opportunity" may be used interchangeably in the present disclosure.

Allocation of grant-free transmission occasions may occur in a number of different ways. Some examples of grant-free allocation are described in a co-pending U.S. patent application Ser. No. 15/830,928. In some embodiments, the allocation may be made using a grant-free scheme in which only RRC messaging is used. In some embodiments, the allocation may be made using a grant-free scheme in which RRC messaging is used in combination with downlink control information (DCI) messaging. Information or parameters that may be provided to configure the grant-free allocation in either scheme includes a periodicity that defines a time duration between grant-free resource occasions, an offset that defines the starting time reference of a grant-free resource, a time domain resource allocation configuration that defines further the location of grant-free resources in the time domain, a frequency domain resource allocation configuration that defines the frequency location of a grant-free resource, a number of repetitions K of a grant-free transmission and a redundancy version (RV) sequence. The time domain resource allocation configuration may define the starting and ending symbol of the first repetition resource of each transport block (TB). The frequency domain resource allocation configuration may include Bandwidth part (BWP) information and resource block assignment, and reference signal (RS) parameters. Other information may also be included, such as modulation and coding scheme (MCS) information. Allocation of the UL grant-free transmission occasions is expected to be supported on the basis of a slot or mini-slot.

With regard to UE specific information, the RRC signaling may be used to notify UE capable of supporting a grant-free scheme about information relevant to grant-free transmission such as, but not limited to, a UE ID, a DCI search space, grant-free transmission resources, RS resources and other relevant information that may include for example, MCS. The RRC signaling may include a grant-free ID field (such as GF-RNTI) and one or more configuration fields for configuring for UL (gf-ConfigUL) and/or for configuring for downlink (DL) (gf-ConfigDL).

The signaling for grant-free resource allocation may include, but is not limited to, information such as UL-TWG-periodicity, a time offset value, a time-domain-resource-configuration, a frequency domain resource allocation configuration, a Demodulation Reference Signal (DMRS) configuration field UL-TWG-DMRS, a UL-TWG-MCS-TBS, a repetition K, and UL-TWG-RV-rep.

The UL-TWG-periodicity, denoted by P, is a periodicity that defines the interval between two adjacent grant-free transmission resource bundles. Each grant-free resource bundle may include K transmission occasions that are allocated for K repetition of a transmission block (TB). The K repetitions are considered to include a first transmission and K−1 repetitions. The periodicity P may be defined as a number of symbols or a number of slots. The possible values of P can be different for different numerologies, it may include 2 symbols, 7 symbols, 1 slot and a length equal to multiple slots.

A time offset value indicates the starting time location of one grant-free resource, e.g. the offset value can indicate the starting time location (e.g. a slot index) of the grant-free resource with respect to a system frame number (SFN)=0. In some embodiments, the offset may not need to be signaled, and it can have a default value, e.g. at slot 0.

Time-domain-resource-configuration (which may also be known as Time-domain PUSCH resources) provides additional parameters to indicate a time domain resource allocation configuration for grant-free transmission opportunities. Time-domain-resource-configuration may include the starting symbol and the length in terms of number of OFDM symbols of the first repetition resource of each transport block (TB). In some embodiments, the time-domain-resource-configuration may indicate a row index of an RRC configured table (the table can be UE specific), where the row index defines a slot offset K2, and a start and length indicator SLI, and the PUSCH mapping type to be applied in the PUSCH reception. For Type 1 grant-free transmission, the slot index K2 may be ignored. The start and length indicator SLI defines the starting symbol S relative to the start of the slot and the number of consecutive symbols L counting from the symbol S. The mapping type may contain mapping type A and B. For mapping type A, the location of a DMRS may be fixed at a predefined symbol location within the slot (e.g. starting at the $3^{rd}$ OFDM symbol of the slot). For mapping type B, the location of the DMRS among the slot may depends on the symbol location of the grant-free PUSCH resources within the slot, for example, the DMRS may start at the symbol S defined in SLI. In some embodiments, the mapping type can also be used to indicate whether the grant-free resource allocation is the slot based repetition or mini-slot based repetition, e.g., mapping type A may indicate it is slot-based repetition while mapping type B may indicate it is mini-slot based repetition. There may also be fields for grant-free specific power control related parameters, which may include target receive power P_0 and a path loss compensation factor alpha.

The frequency domain resource allocation configuration defines a frequency location of a grant-free resource. It may include the Bandwidth part (BWP) information and resource block assignment within the active BWP. The resource block assignment indicates which resource blocks (RBs) or resource block groups (RBGs) are used for the transmission. RBG is a set of consecutive physical resource blocks defined by the RBG size as the number of RBs per RBG. The resource block assignment may include the starting resource block (RB) or starting resource block group (RBG), and the number of RBs or RBGs for the frequency resource of the grant-free transmission. Alternatively, the resource block assignment may include a bit map indicating which RBs or RBGs are used within a BWP.

In some embodiments, the frequency domain resource allocation configuration may work in a similar way as a frequency domain resource allocation configuration works in a grant-based DCI case. An additional single bit may be used in the frequency domain resource allocation configuration RRC parameter to indicate a frequency allocation type. The additional single bit can indicate one of two different types of frequency allocations. In an example of a first type (Type 0) of frequency resource allocation, resource block assignment information includes a bitmap indicating the RBGs that are allocated to the scheduled UK The size and location of each RBG may be determined by the size of the carrier bandwidth part and some RRC configured parameters related to RBG sizes. An example of a second type (Type 1) of frequency resource allocation includes resource block assignment information indicating, to a scheduled UE, a set of contiguously allocated localized virtual resource blocks within the active carrier bandwidth part. An uplink resource allocation field for the second type includes a resource indication value (RI) corresponding to a starting virtual resource block ($RB_{start}$) and a length in terms of contiguously allocated physical resource blocks $L_{RBs}$. The frequency resource allocation scheme Type 0 is supported for OFDM-based uplink data transmission (PUSCH). The uplink frequency resource allocation scheme Type 1 is supported for uplink data transmission (PUSCH) for both cases when transform precoding is enabled or disabled.

For Type 1 grant-free UL transmission which is based on RRC configured grant-free resources, in some embodiments, the frequency domain resource allocation may include a one-bit element in the RRC parameter to indicate a frequency allocation type (Type 0 or 1, the different types of allocation are described above, to differentiate between the two types). As a result, a frequencyDomainAllocation field in RRC signaling that is configured for Type 1 grant-free transmission can appear as Type 0 (a bit map indicating which RBGs are used for the transmission), which indicates a Type 0 uplink frequency domain resource allocation for grant-free transmission, or Type 1 (resource indication value (RIV)), which indicates a starting virtual resource block and a length in terms of contiguously allocated physical resource blocks.

That is, the frequencyDomainAllocation field may include a bit map indicating a Type 0 frequency domain resource allocation, or a RIV indicating a Type 1 frequency domain resource allocation.

The Demodulation Reference Signal (DMRS) configuration field UL-TWG-DMRS defines the DMRS parameters allocation. For example, an antenna port value may be provided by UL-TWG-DMRS. TWG refers to "transmission without grant", which may be also called "grant-free" or "configured grant".

The UL-TWG-MCS-TBS provides a MCS or a transport block size (TBS) value for grant-free transmission.

The periodicity (UL-TWG-periodicity) can be defined in multiple different ways depending on how the grant-free resource occasions are allocated. In some implementations, the periodicity is defined by the period between the two K bundled grant-free resource occasions corresponding to K repetitions of a TB together with an offset value, and a manner of defining a size of the grant-free resource occasion, such as a starting OFDM symbol and the number of symbols L that are being allocated in a slot.

That is, in some embodiments, the periodicity defines a period between two grant-free resources, with each resource including K TOs for transmitting K repetitions of a TB. Other parameters configured for the grant resource configuration include an offset value, which indicates where the starting slot of the resource is within a periodicity, a parameter for defining a size of a TO, a parameter indicating a starting OFDM symbol in a TO, and a parameter indicating the number of symbols L that are configured in a TO of a slot.

The repetition K defines the number of repetitions for each grant-free transmission of a TB.

UL-TWG-RV-rep defines a redundancy version (RV) pattern. A transmission can be retransmitted or repeated multiple times to ensure that a receiver receives and can decode the transmission. The receiver can combine multiple transmissions to decode the transmission. Initial transmissions and retransmissions may use different redundancy versions (RVs). When data is encoded in a grant-free message generator, the encoded bits may be partitioned into different sets (that possibly overlap with each other). Each set is a different RV. For example, some RVs may have more parity bits than other RVs. Each RV is identified by an RV index (e.g. RV 0, RV 1, RV 2, . . . , etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder in the grant-free message generator in the UE may perform the channel coding.

The RV pattern is a sequence of indices, where each index is mapped to a respective one of the K resource occasions being allocated. The RV sequence can be repeated based on the value of K. For example, for the nth transmission occasion among K repetitions, n=1, 2, . . . , K, it is associated with (mod(n−1,4)+1)th value in the configured RV sequence. Examples of RV sequences include one of {0 0 0 0}, {0 2 3 1} or {0 3 0 3}. In the examples shown there are four indices. For values of K equal to 1 or 2, only the first one or two indices of the RV sequence may be mapped to the respective K=1 or 2 resource occasions. For a value of K equal to 4, the entire set of four indices of the RV sequence may be mapped to the K=4 resource occasions. For a value of K equal to 8, the entire set of four indices of the RV sequence may be mapped to the first four resource occasions and then repeated for the second four resource occasions.

SFI signaling may result in a change to the transmission directionality of OFDM symbols in a slot. For instance, an OFDM symbol in a slot may have been allocated as a flexible symbol in the semi-static UL-DL transmission direction configuration. The UE may then receive a dynamic SFI signal, which may override the symbol to be an UL or DL or unknown symbol. If some OFDM symbols were indicated as UL symbols in the SFI, those OFDM symbols may be able to be used for UL grant-free transmissions.

In some embodiments, UL grant-free transmissions are only transmitted in an OFDM symbol indicated for UL by a semi-static UL/DL configuration, or a flexible OFDM symbol that is specifically configured by the SFI to be an UL OFDM symbol. In some embodiments, an UL grant-free transmission may also be able to be transmitted at the location of an OFDM symbol that is indicated as flexible by a semi-static UL-DL configuration. In some embodiments, an UL grant-free transmission may only be able to be transmitted at the location of an OFDM symbol that is indicated as flexible by a semi-static UL-DL configuration, if the UE is not configured to monitor a SFI that indicates the transmission direction of this symbol, or if the UE detects a SFI that overrides the transmission direction of this symbol to uplink.

In the following, it is considered that a UE obtains the transmission direction of OFDM symbols used for grant-free transmission through a UL-DL transmission direction configuration. The UL-DL transmission direction configuration includes the semi-static UL-DL transmission direction configuration and a dynamically configured SFI, if the UE is configured to monitoring the dynamic SFI and detects the dynamic SFI for the transmission direction configuration of the resource. For notational simplicity, the UL-DL transmission direction configuration may be referred to as a UL-DL configuration in this disclosure.

Aspects of the present application pertain to enabling the UE to update UL grant-free transmission resources to resolve a conflict of the semi-static or semi-persistently allocated grant-free transmission resources with the UL-DL transmission direction configuration. Aspects of the present application may also pertain to enabling the UE to update the allocation of UL grant-free transmission opportunities to avoid conflict with transmission resources allocated for control signals, reference signals or other data signals. Transmission resources used for control signals may include OFDM symbols that have been configured for control information such as scheduling requests (SR), HARQ feedback or other Physical Uplink Control Channel (PUCCH) signals. Transmission resource reference signals may include the configuration of sounding reference signal (SRS). The control signal or reference signal may be configured semi-statically (e.g. in RRC messages) or dynamically (e.g. in DCI). Aspects of the present application may also pertain to transmitting the grant-free transmission on a new set of resources in a case where the allocated grant-free resource is in conflict with the UL-DL transmission direct configuration or a configuration of a reference, control or data signal. Note that all the method/example described for the conflict resolution of UL grant-free resource configuration with the UL-DL configuration can also be applied to the conflict resolution of UL grant-free resource configuration and the configuration of control signal, reference signals and other data signals.

In LTE, for a frame having 10 ms subframes, where some of the subframes in the frame are used for DL and some of the subframes are used for UL. LTE semi-persistent scheduling (SPS) does not support dynamic time divisional duplexing mechanism (i.e. indicating TDD UL-DL configuration dynamically). If the schedule interval or periodicity of an SPS transmission is greater than 10 ms, then the periodicity is rounded to an integer number of 10 ms subframes. This is because the supported TDD UL-DL configuration is defined based on a pattern of each sub frame among one frame being an UL subframe, DL subframe or special subframe, and the same TDD UL-DL configuration is used for each frame which is 10 ms in length. Therefore, if the first SPS resource is located on an UL subframe, a next transmission opportunity also occurs in a UL subframe. If the periodicity is less than 10 ms, then the SPS transmission is dropped if the transmission is located in a DL subframe or a special subframe.

The resource configured for grant-free repetition can be slot based repetition or mini-slot based repetition. Slot based repetition means there is at most one repetition per slot, while mini-slot based repetition may support multiple grant-free repetitions per slot, where each grant-free transmission occasion may include a number of OFDM symbols.

In some embodiments, a decision is to be made as to whether to use a single transmission occasion per slot or multiple transmission occasions per slot (mini-slot) approach. In some embodiments, a decision is made based on periodicity P and a repetition number K. For example, if P/K<=1 slot, where P is the periodicity and K is the number of repetitions per period, then in this scenario, a mini-slot based repetition can be used In some embodiments, a decision is made based on if P/K>1 slot. In this scenario, a slot based repetition with 1 repetition per slot can be used. The offset is an integer number of slots and only useful if P>1 slot. More generally, while 1 slot is used in the examples above as a comparative value for P/K, it should be understood that some other threshold could be used to make the determination other than a slot.

In one example, if P/K<=1 slot, where P is the periodicity and K is the number of repetitions per period, then, slot based repetition is used. In another example, if P/K<1 slot, where P is the periodicity and K is the number of repetitions per period, then a mini-slot based repetition may be used; otherwise, if P/K>=1 slot, slot based repetition is used.

For a Type 1 grant-free transmission, the RRC configured periodicity P, the offset O, and time-domain-resource-allocation (also known as timedomainconfiguration), which defines a starting symbol S and a length of symbols L), the repetition K, the RV pattern, and UL-TWT-RV-rep together define the transmission occasions (TOs) for K repetitions of a TB. When P>=1 slot, the starting transmission occasion of the K repetitions of each TB is located in slot M=Offset+N*P (with all unit converted to slot), where N is an integer and denotes a periodicity index while P denotes the duration of the period. If P<1 slot, e.g., P=2 or 7 symbols, the starting symbol of the first grant-free TO is determined by the starting symbol S and the length L from time-domain-resource-allocation at a slot determined by the offset (O). For a slot based repetition, the following K−1 grant-free TOs for the repetitions of the same TB are located in the subsequent K−1 slots following the first TO with the same starting symbol and length as the first TO. For a mini-slot based repetition, the following K−1 grant-free TOs for the repetitions of the same TB are located in the following symbols with length L following the previous TO of the same TB.

For a Type 2 grant-free transmission, the periodicity P is defined in the RRC. The offset is determined when slot activation DCI received. The "timedomainconfiguration" includes SLIV and a slot offset K2, where K2 is the offset between the DCI and the transmission opportunity).

In situations where there is no conflict between a previously allocated grant-free resource allocation and a UL-DL configuration, then a resource occasion allocated for grant-free transmission is identified within a slot based on an offset from a reference point and the defined periodicity allocated for the grant-free transmission. A resource occasion is then allocated for repetitions in subsequent slots. When a conflict arises between a previously allocated grant-free resource occasion and a UL-DL configuration, then the UE can take steps to modify the grant-free allocation to mitigate the conflict.

An example of a conflict may include a scenario in which the number of OFDM symbols available for UL traffic that can be allocated for a grant-free transmission occasion is less than or equal to α×L, where 0≤α≤1 and α is a configurable, predefined ratio, and L is the length of OFDM symbols configured to be used for the grant-free resource occasion. Another example of a conflict may include a scenario in which the number of OFDM symbols available for UL traffic that can be allocated for a grant-free transmission occasion is less than L In another word, there is at least one OFDM symbol configured by UL-DL configuration that is not available for UL transmission. Another example of a conflict may include a scenario in which the number of OFDM symbols available for UL traffic that can be allocated for a grant-free transmission occasion is less than or equal to a predefined or configured threshold. Another example of a conflict may include a scenario in which the number of OFDM symbols available for UL traffic that can be allocated for grant-free transmission occasion is, for a slot based repetition, the number of OFDM symbols available for UL traffic in a slot, and is less than or equal to L Another example of a conflict may include a scenario in which the number of OFDM symbols available for UL traffic that can be allocated for grant-free transmission have at least some overlap with a configured reference signal, control signal or data signal.

As described above, an example conflict may include a scenario in which the number of OFDM symbols available for UL traffic that can be allocated for grant-free transmission occasion is, for a slot based repetition, the number of OFDM symbols available for UL traffic in a slot, and is less than or equal to L. This example of conflict is for a slot based repetition, and the number of OFDM symbols available for UL traffic in the slot allocated for grant-free transmission occasion is less than or equal to L.

The OFDM symbols that can be considered to be available for UL grant-free transmission occasions include at least one of 1) an UL symbol configured by a semi-static UL/DL transmission direction configuration, 2) an UL symbol or flexible/unknown symbol configured by a semi-static UL-DL transmission direction configuration, 3) an UL symbol or flexible/unknown symbol configured by a semi-static UL-DL transmission direction configuration that is not overridden by a dynamic SFI, 4) a symbol that is configured not as a DL symbol by a semi-static UL-DL transmission direction configuration, 5) a flexible symbol as configured by a semi-static UL-DL transmission direction configuration, but reconfigured to be an UL symbol by a dynamic SFI, 6) a flexible symbol as configured by a semi-static UL-DL transmission direction configuration, but reconfigured to be an unknown/flexible symbol by a dynamic SFI, where for any of 1) to 6), the symbol does not conflict with a configuration of other signals. The above confliction condition and definition of available UL symbols according to the UL-DL configuration may be applicable to all examples/schemes described in this disclosure. For notational simplicity, we may simply use conflict or in conflict to refer to any of the above conflict conditions, and we may simply use available OFDM symbols or available UL OFDM symbols to refer to any of the definition of available symbols above based on the UL-DL configuration.

As one example, the OFDM symbols that can be considered to be available for UL grant-free transmission occasions include 1) an UL symbol configured by a semi-static UL/DL transmission direction configuration; 2) a flexible symbol as configured by a semi-static UL-DL transmission direction configuration, but reconfigured to be an UL symbol by a dynamic SFI. In this case, all the other configurations of OFDM symbols configured by the UL-DL transmission direction configuration may be considered not available for UL transmission In some embodiments, a grant-free allocation can be performed to avoid conflict between a previously allocated grant-free resource allocation and a UL-DL configuration for slot based repetition (i.e. on a single transmission per slot basis). In this case, based on grant-free resource configuration, a resource occasion is allocated for a first transmission in a first slot, which is determined by the periodicity, offset and time-domain-resource-allocation as described earlier, and resource occasions for the following K−1 repetitions of the TB are allocated in subsequent slots. FIGS. 3A, 3B, 4, 5 and 6 are examples pertaining to a single grant-free resource occasion being allocated per slot.

Figure 3A:
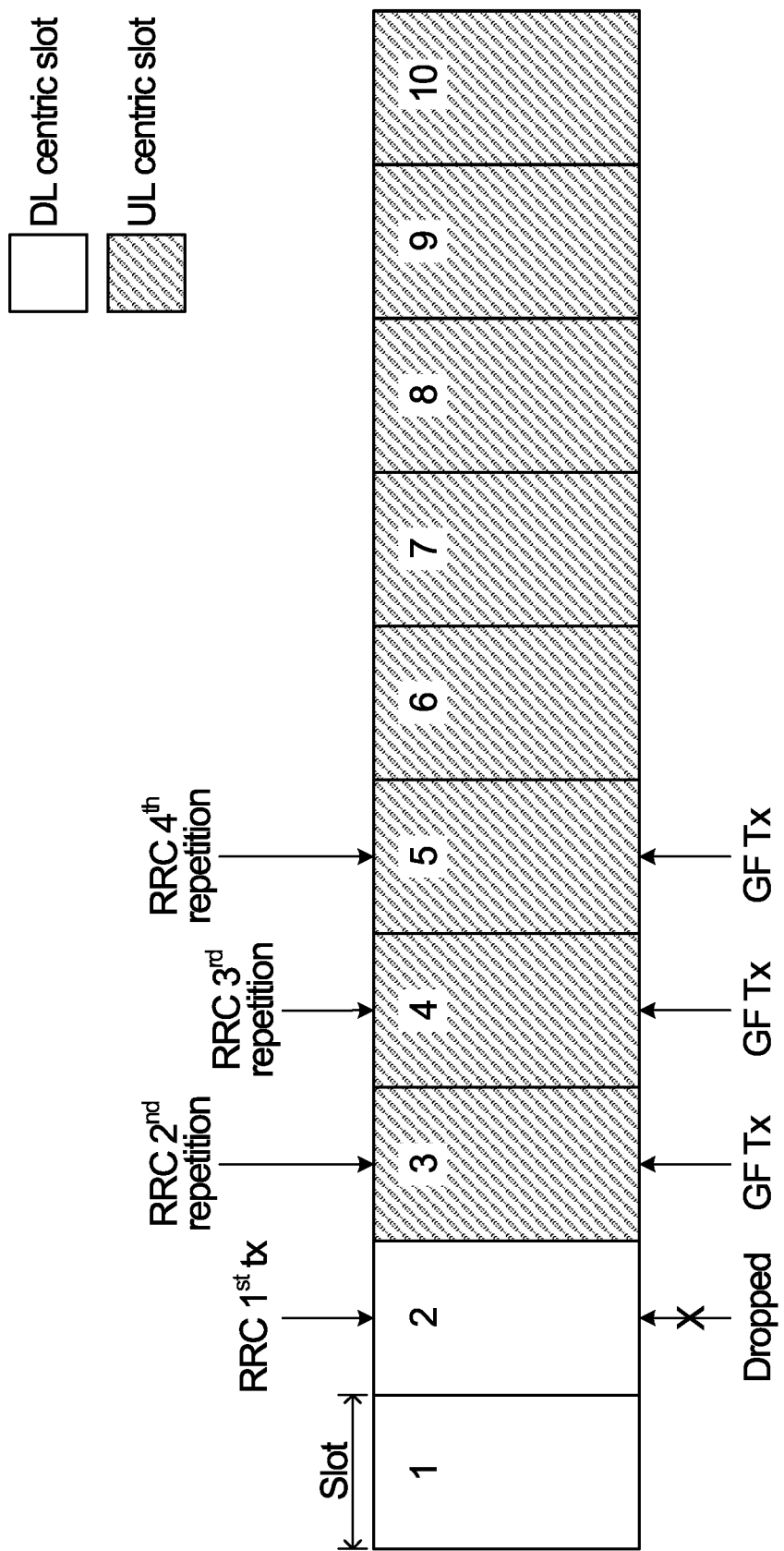
FIGS. 3A and 3B illustrate examples of a slot based grant-free resource occasion allocation to avoid conflict of resources.

FIG. 3A illustrates an example of a portion of a transmission resource including 10 slots that are consecutive in the time domain and that can be used for DL and/or UL traffic. It is indicated that slots 2 to 5 were previously allocated by RRC for UL grant-free transmission occasions. Slot 2, 3, 4, 5 are considered as the $1^{st}$, $2^{nd}$, $3^{rd}$, and $4^{th}$ previously allocated grant-free TOs. For example, the first TO in slot 2 is determined by the periodicity and offset in RRC configurations. The OFDM symbols within slot 2 are determined by the starting symbol S and length L configured in time-domain-resource-allocation. The number of repetition K is configured to be 4. Therefore, in the case of no conflict, the same symbols in slot 3 to slot 5 are used for the following K−1 transmission occasions. Based on a UL-DL configuration, which may be the result of a semi-static UL-DL configuration or the result of a semi-static UL-DL configuration and a dynamic SFI, the symbols within each slot may be indicated as DL, UL or flexible symbols. Slot 2 may have some conflict with the allocated grant-free resource for the TO based on the UL-DL configuration. There are different definitions of conflict conditions that may be applied here as described earlier in this disclosure. For example, if the slot is a DL only or DL centric slot (majority of the symbols are indicated as DL symbols), or if the number (X) of available UL symbols in the slot is less than A, i.e., X<A (A is a predefined threshold, e.g. A=0,1), or if the number (X) of available UL symbols in the slot is less than L, i.e., X<L, where L is the length of the symbols configured for the TO. UL-DL configuration of Slots 3 to 10 does not have any conflict with grant-free resource allocations. For example, slots 3 to 10 may be UL only or UL centric slots, or the slots do not satisfy the conflict condition with the grant-free TO allocation.

Figure 3B:
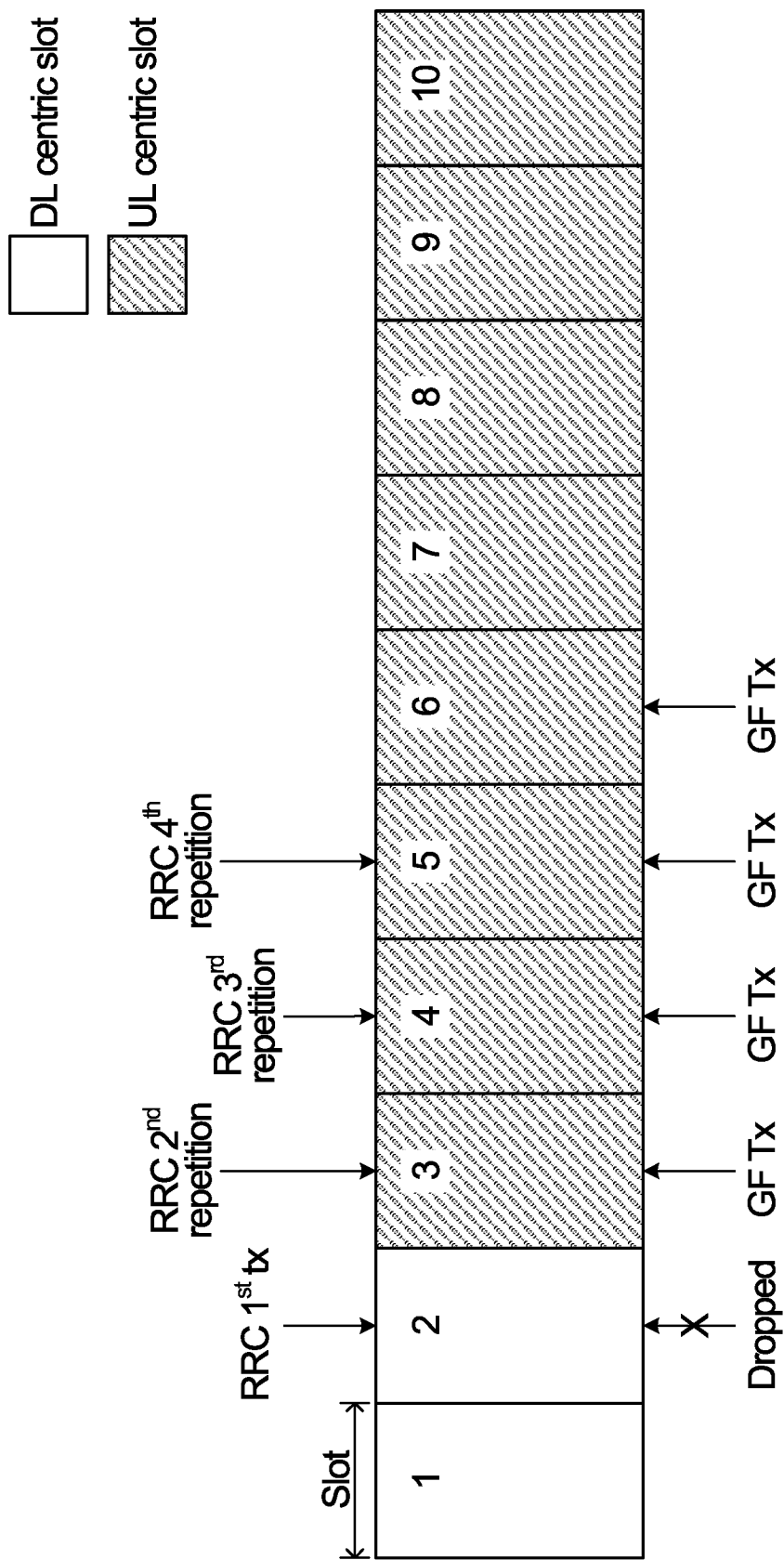

FIG. 3A and FIG. 3B show two different solutions with regard to resolving the conflict. The UE may drop/omit the grant-free TO in conflict from the K repetitions as described in FIG. 3A or postpone the grant-free TO as described in FIG. 3B. When the UE drops/omits the TO, the UE does not add additional TO beyond the originally configured K TOs. For slot based repetition, UE may postpone the TO to the next slots that are not in conflict. In FIG. 3A, the first slot previously allocated for the first grant-free TO, slot 2, is omitted as a UL grant-free transmission occasion for use by the UE and the UE uses the previously allocated grant-free transmission occasions of slots 3 to 5. Slot 3 can be used as a first transmission of a TB, and slots 4 and 5 used for the subsequent repetition transmissions of the same TB.

In a particular example, even though K, the number of repetitions configured by the network, is equal to 4, only a total of 3 repetition transmissions can be performed for the TB, which uses the $2^{nd}$, $3^{rd}$ and $4^{th}$ TO of the previously allocated grant-free transmission occasions as the updated grant-free transmission occasions for the actual grant-free transmission. In such an example, the indices in the RV sequence are mapped to the actual number of repetitions that is performed. For an RV sequence={0 2 3 1} and K=4, when the first transmission occasion (slot 2) is dropped, the first three RV sequence indices {0 2 3} are mapped to the three updated grant-free transmission occasions in slots 3 to 5. In this example, if the UE has UL grant-free traffic that has arrived before slot 2, the UE can only perform 3 repetitions of the TB at slot 3 to 5 using RV sequence {0 2 3}, respectively.

In another example, when the transmission occasion is dropped, the corresponding RV index is also dropped from the RV sequence/pattern. In such an example, the RV sequence is mapped to the previously allocated grant-free transmission occasions (in this example, the original continuous slots, slot 2-5). For a RV sequence={0 2 3 1} and K=4, when the first transmission occasion (slot 2) is dropped, the remaining RV sequence indices {2 3 1} are mapped to slots 3 to 5, respectively.

FIG. 3B illustrates the method of postponing the grant-free transmission occasions in conflict, i.e., the UE delays the current transmission occasions and may add additional transmission occasions to try to keep the number of grant-free transmission occasions to be K, the same as the repetition number original configured. The delay may be on a slot to slot basis for slot based repetition until a non-conflict TO is found. The UE may find the closest K non-conflict grant-free transmission occasions for the K repetitions within a window T after the first transmission occasion, where the length of the window T can be the periodicity P configured for grant-free transmission. FIG. 3B illustrates a similar example group of 10 slots to be used for DL and/or UL traffic. It is indicated that slots 2 to 5 were previously allocated for grant-free transmission occasions. The first slot previously allocated for UL grant-free traffic, slot 2, is omitted as a UL grant-free transmission occasion for use by the UE, and the UE then determines if there are K non-conflict transmission occasions available within the period. The period can be the P symbols counting from the starting symbol of the first transmission occasion, where P is the periodicity of the grant-free resource configured in RRC. In FIG. 3B, the UE uses the previously allocated grant-free transmission occasions of slots 3 to 5, but adds an additional transmission occasion, slot 6, so the overall number of transmission occasions is maintained at K=4. It may be considered that the K=4 transmission occasions are shifted to the next available group of K=4 slots that is not conflict with the UL-DL configuration.

In some embodiments, if K non-conflict slots are not available within a first period before a new transmission and associated repetitions are scheduled in a next period, then the UE may not allocate any transmission occasions within the first period and wait for the next period. In other embodiments, if K non-conflict slots are not available within a first period before the start of the next period that is configured for a new transmission and associated repetitions, then the UE may not use any resources in the next period for grant-free transmission occasions and therefore use less than K transmission occasions within the first period.

Note that although FIGS. 3A and 3B are described based on a slot basis, i.e., the dropping, or postponing of a TO is slot by slot. The slot can be generalized to any transmission unit, i.e., the slot shown in the figures can be a transmission unit, for which the transmission unit can be a slot, a mini-slot, an OFDM symbol, a subframe, a number of OFDM symbols or any length of time unit for a grant-free transmission.

Figure 4:
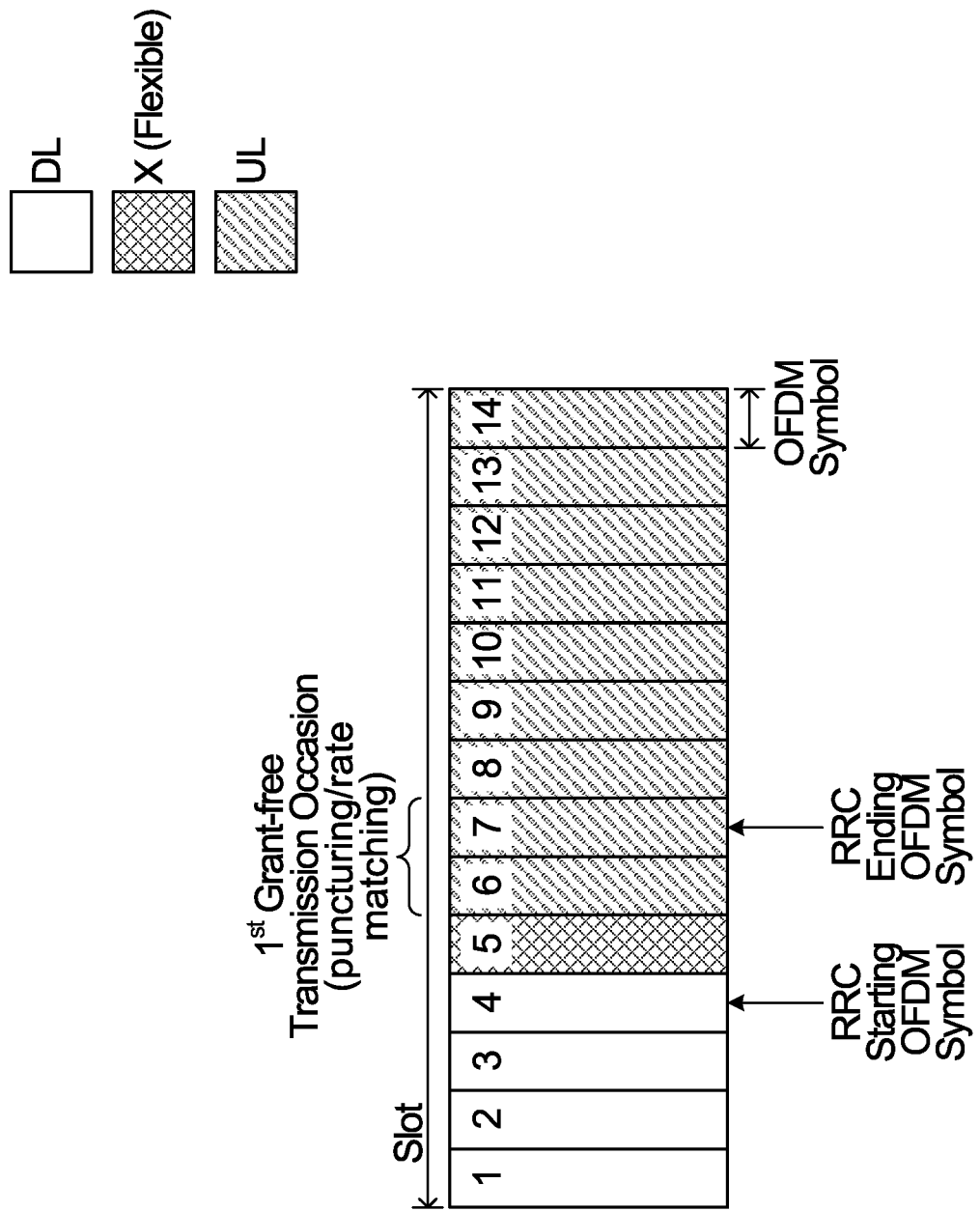
FIG. 4 illustrates an example of a slot based grant-free resource occasion allocation at the OFDM symbol level to avoid conflict of resources.

FIG. 4 illustrates an example of puncturing/rate matching solution for resolving the conflict. FIG. 4 shows how to determine the OFDM symbols used for grant-free transmissions within the slot for slot-based repetition. The same principle may be applicable to the mini-slot based repetition. In FIG. 4, a more detailed view of a single slot having 14 OFDM symbols is shown, where OFDM symbols 4 to 7 were previously allocated for grant-free transmission occasions by RRC signaling. From the result of a UL-DL configuration of slot format, OFDM symbols 1 to 4 are allocated for DL traffic, OFDM symbol 5 is allocated to be flexible that can be further configured for DL or UL traffic, and OFDM symbols 8 to 14 are allocated for UL traffic. Since OFDM symbols 4 and 5 were previously allocated as part of a first grant-free transmission occasion, but is configured to be DL and flexible symbols by UL-DL configurations, respectively, this becomes a conflict condition for the UE with regard to the UL grant-free allocation.

FIG. 4 shows how only OFDM symbols 6 and 7 are used from the original grant-free transmission occasion of OFDM symbols 4 to 7 for the first grant-free transmission. As only two UL OFDM symbols based on UL-DL configuration are available to the UE, the UE punctures the information of four OFDM symbols for transmission on the two available OFDM symbols, or rate matches the information for four OFDM symbols for transmission on the two available OFDM symbols.

For the K transmission occasions allocated for the first transmission and K−1 repetitions, each transmission occasion has a determined number of available OFDM symbols, which may be based on the length L from time-domain-resource-configuration. In FIG. 4 for example, the first transmission occasion has only two available OFDM symbols. The second, third and fourth transmission occasions (not shown) for the second, third and fourth repetitions (the initial transmission is considered as the first repetition), respectively, may each have four available OFDM symbols. The K grant-free transmission occasions may each be configured to utilize four OFDM symbols for transmission. A transport block size (TBS) is the number of information bits in each transport block. As with grant-based transmission, TBS is also determined based on the configured MCS value and the available time-frequency resources for the transmission of the TB. The available time-frequency resources are typically based on the available resource elements within the number of OFDM symbols and the number of RBs in frequency domain allocated for the transmission, excluding any reference signal or control signal allocated in the resource. For the K grant-free transmission occasions corresponding to the K repetition of a TB configured with a length of L symbols, assume the number of available UL symbols are $X_1, X_2, \ldots, X_K$ for the $1^{st}, 2^{nd}, \ldots$, K-th GF transmission occasions based on the UL-DL configuration. In order to combine all the repetitions of the TB for better detection, the TBS of all the K repetitions should be kept the same. A TBS for transmission of information by the grant-free allocation is determined based on the configured MCS and time-frequency resources derived based on a number Y of OFDM symbols, where Y can be equal to (i) a number L of OFDM symbols configured by the network, where L is the length configured in time-domain-resource configuration, (ii) a number of available UL OFDM symbols in the first transmission occasion, or (iii) a minimum number of available UL OFDM symbols from the set of available UL OFDM symbols for each of the K transmission occasions of the same TB (.e., $Y=\min\{X_1, X_2, \ldots, X_K\}$. The UL grant-free information can be prepared for transmission based on the available UL OFDM symbols to be used for each grant-free transmission occasion. The TBS is then rate matched to the available UL OFDM symbols $X_i$ in i-th grant-free transmission occasion of the TB. For the i-th grant-free transmission occasion, if the Y is less than the available number of UL OFDM symbols for a given grant-free transmission occasion $X_i$, then the available OFDM symbols can be filled using a cyclic repetition of the Y OFDM symbols that is used to determine the TBS. For example, if only two OFDM symbols are needed, but four OFDM symbols are available, then the same two OFDM symbols can be transmitted twice over the four available OFDM symbols. If Y is more than the available number of UL OFDM symbols for a given transmission occasion, then the available UL OFDM symbols can be filled with a set of OFDM symbols that have been punctured, or otherwise rate matched. If $Y=X_i$, then there may be no puncturing/rate matching or cyclic repetition that needs to be done. When puncturing/rate matching is performed, the location of DMRS symbols may also need to be predetermined based on the $X_i$ available UL OFDM symbols instead of the original L configured OFDM symbols, for example, the DMRS may be located starting in the first symbol of the available $X_i$ UL OFDM symbols.

The following gives an example of determining the TBS. The configured MCS information indicates a MCS index which provides the modulation scheme and the target code rate. If the number of configured OFDM symbol for the GF TO is L, and the actual available UL OFDM symbol for the GF TO is X, where X<L, the UE may determine the TBS according to the L symbols. If the configured DMRS is located outside the X symbols, the UE should assume the DMRS is located within the X symbols (e.g. starting at first symbol of the available L symbol). The UE calculate the available resource elements (RE) for data transmission based on the time-frequency resource of the X symbol along with the resource blocks assigned in the frequency domain after removing the REs used for DMRS transmission. The UE can then determine the number of coded bits that can fit in the available REs based on the modulation scheme. Then UE can determine the TBS based on the number of coded bits along with the target code rate. After determining the TBS, the UE can then select the mother code used for channel coding (e.g. based on LDPC codes or turbo codes). After that, the desired encoded bits can be chosen based on the RV using rate matching and mapped to the available resources for transmission.

There are different ways of doing puncturing/rate matching. For example, if the TBS is based on the original configured L OFDM symbols and only X UL OFDM symbols are available for the TO, then after determining the TBS, one method to do puncturing is to do rate matching and mapping to the resources exactly the same based on the L configured resources. However, the modulated symbols that are originally to be transmitted on the OFDM symbols outside the X available UL symbols are not transmitted. This is one method of puncturing. Another way to do puncturing/rate matching is that, after determining the TBS, the UE first recalculates the code rate based on the available UL resources given by the X available UL symbol. Because X<L, the new target rate should be much smaller than the target code rate indicated by the MCS configuration. The UE then reselect the mother code based on the new target code rate and re-do rate matching and remap encode bits to the available UL resources in the X available UL symbols. Note that the TBS determination and puncturing/rate matching methods described above can apply to all the examples/methods/schemes in this disclosure.

Note that in the few examples described in this disclosure, flexible is considered to be not available for UL grant-free transmission. However, in some embodiments, flexible can be considered as available for UL grant-free transmission, i.e., it can be overridden by the UL grant-free configuration to be used for UL grant-free transmission. In this case, a flexible symbol can be treated the same as an UL symbol for the purpose of determining whether there is conflict between the configured grant-free resources or transmission occasions and the UL-DL configuration and the respective UE behavior. In some embodiments, a flexible symbol in a semi-static UL-DL configuration can be considered available for UL grant-free transmission. In some embodiments, a flexible symbol right after a DL symbol in a semi-static UL-DL configuration may be considered not available for UL grant-free transmission, and any other flexible symbol in the semi-static UL-DL configuration may be considered available for UL GF transmission. However, if a dynamic SFI is received by the UE which overrides the flexible symbol to be a DL symbol or flexible/unknown symbol, the symbol may be no longer available for UL grant-free transmission.

Figure 5:
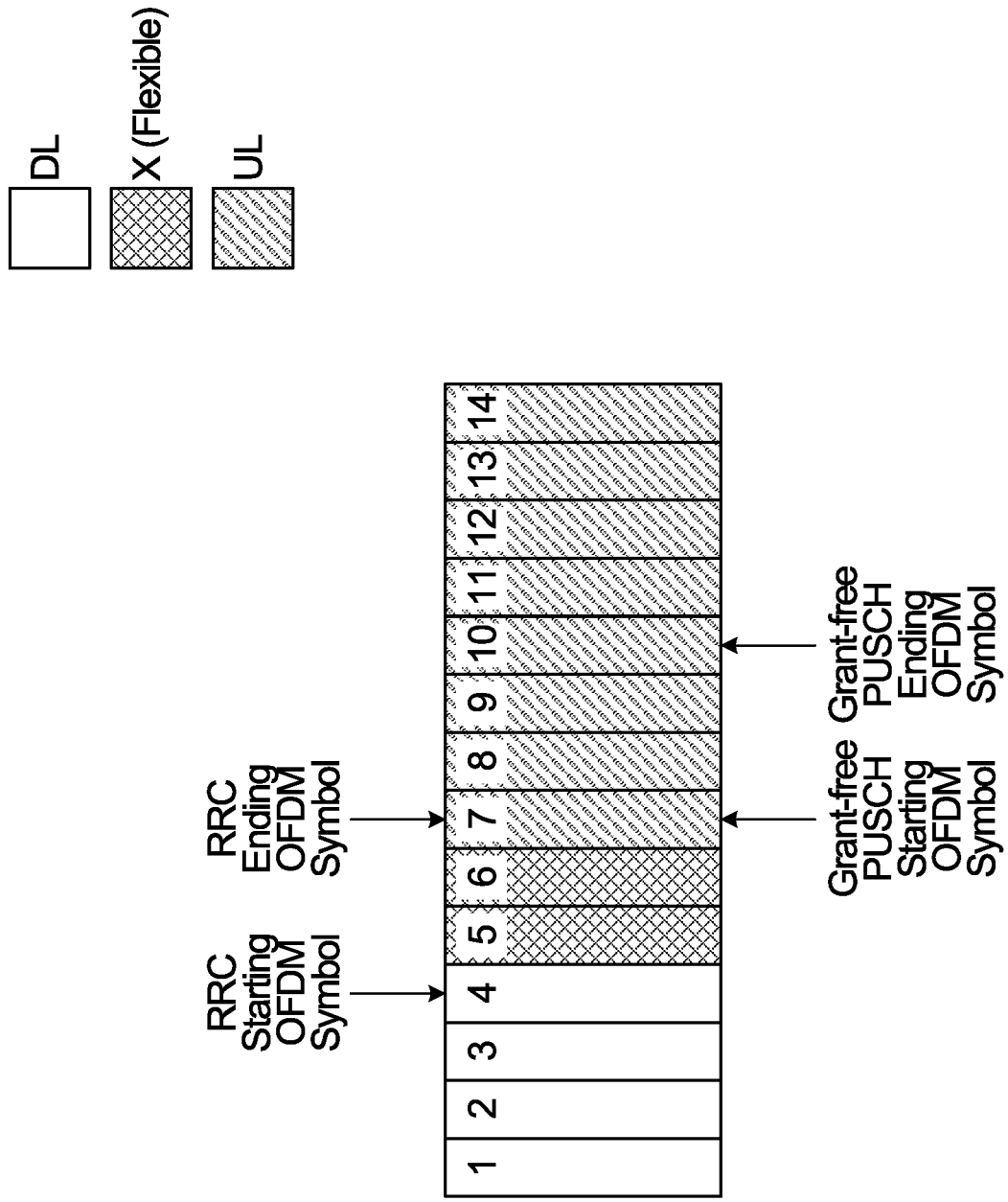
FIG. 5 illustrates another example of a slot based grant-free resource occasion allocation at the OFDM symbol level to avoid conflict of resources.

Another solution with regard to resolving a conflict involves the UE postponing the grant-free transmission occasion. For a slot based repetition, UE may postpone the GF TO within the slot until L consecutive OFDM symbols are available. Then the postponed L OFDM symbols may replace the originally configured L symbols as the grant-free TO. An example is shown in FIG. 5. FIG. 5 illustrates another detailed view of a single slot having 14 OFDM symbols. It is indicated that OFDM symbols 4 to 7 were previously allocated for a grant-free transmission occasion by RRC signaling. From the results of UL-DL configuration, OFDM symbols 1 to 4 are allocated for DL traffic, OFDM symbols 5 and 6 are allocated to be flexible, and OFDM symbols 7 to 14 are allocated for UL traffic. Since OFDM symbols 4 to 6 were previously allocated as part of a first grant-free transmission occasion, but they are configured in UL-DL configuration to be DL symbol and flexible symbol, this becomes a conflict condition for the UE with regard to the UL grant-free allocation.

FIG. 5 shows how the grant-free transmission occasion of four OFDM symbols for a first transmission is shifted, or postponed, from the original OFDM symbols 4 to 7 to the first set of four OFDM symbols available for UL transmission, that is OFDM symbols 7 to 10. In some embodiments, if a flexible symbol is configured by a semi-static UL-DL configuration and it is not overridden by a SFI, the flexible symbol may be considered to be available for UL grant-free transmission. In this case, in the example in FIG. 5, if symbols 5 and 6 are flexible symbols indicated by the semi-static UL-DL configuration, the UE may shift to symbol 5 to 8 for this grant-free transmission occasion. In another embodiment, if the flexible symbol is configured by the semi-static UL-DL configuration and it is not overridden by a SFI, flexible symbols that are not immediately following a DL symbol may be considered to be available for UL grant-free transmission. In this case, in the example of FIG. 5, symbols 5 and 6 are flexible symbols indicated by the semi-static UL-DL configuration, the UE may shift to symbols 6 to 9 for this grant-free transmission occasion.

Figure 6:
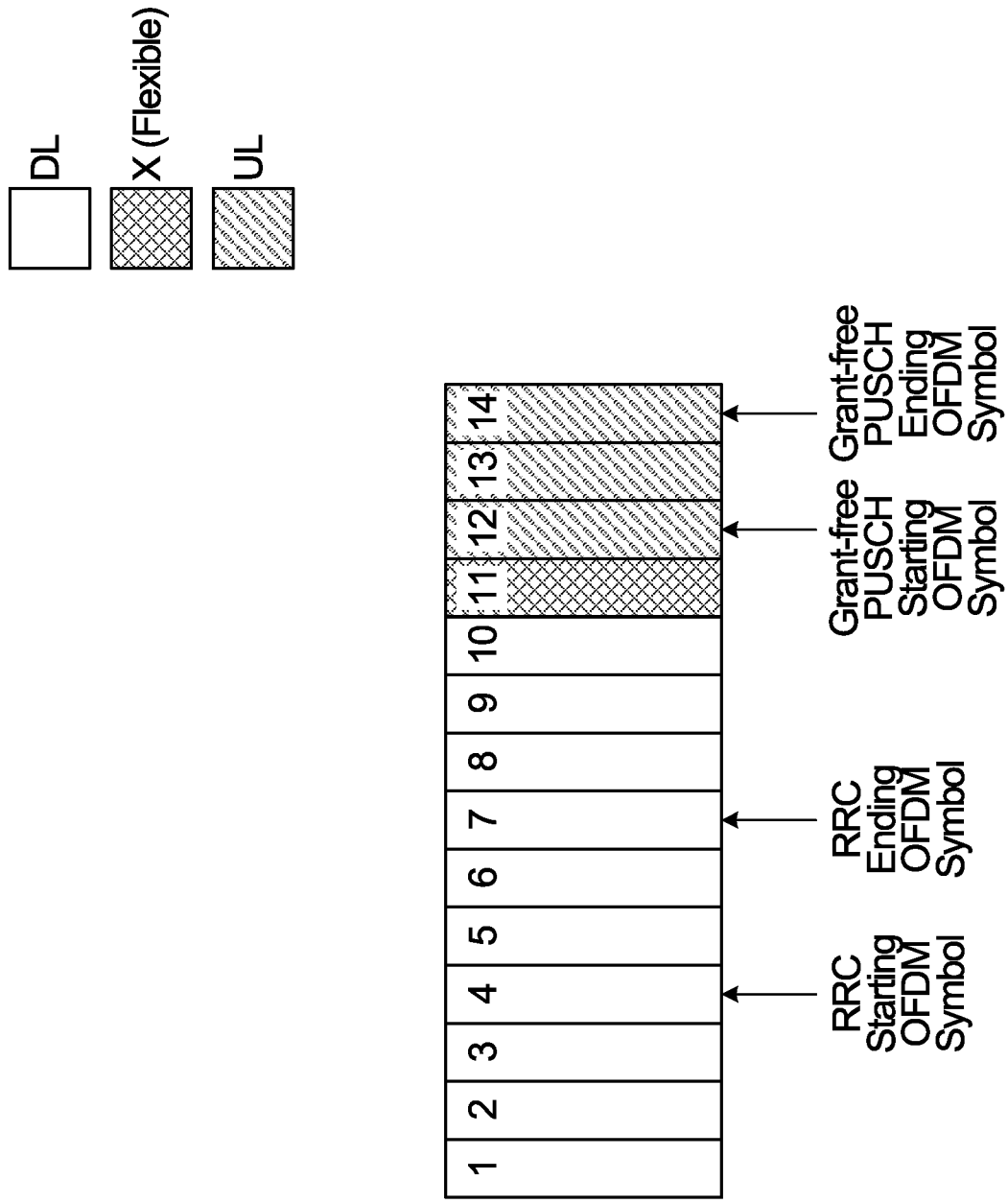
FIG. 6 illustrates a further example of a slot based grant-free resource occasion allocation at the OFDM symbol level to avoid conflict of resources.

FIG. 6 illustrates another detailed view of a single slot having 14 OFDM symbols. It is indicated that OFDM symbols 4 to 7 were previously allocated for grant-free transmission occasions by RRC signaling. From the results of a UL-DL configuration of slot format, OFDM symbols 1 to 10 are allocated for DL traffic, OFDM symbol 11 is allocated to be flexible and OFDM symbols 12 to 14 are allocated for UL traffic. This leaves only three OFDM symbols that could possibly be used for UL grant-free transmission occasions in this slot. Since there are only three OFDM symbols available for an UL grant-free transmission occasion, which is less than the four OFDM symbols configured to be used for an UL grant-free transmission occasion, this becomes a conflict condition for the UE with regard to the UL grant-free allocation.

In the example of FIG. 6, with only three OFDM symbols available, the UE can use the three OFDM symbols by puncturing the information for four OFDM symbols on the three available OFDM symbols, or rate matching to transmit the information for four OFDM symbols on the three available OFDM symbols.

In some embodiments, a grant-free allocation can be performed to avoid conflict between a previously allocated grant-free transmission allocation and a UL-DL configuration for mini-slot based repetition, which supports more than one transmission repetitions per slot. In this case, a transmission occasion is allocated for a first transmission of a TB in a first slot, and transmission occasions for up to K−1 subsequent repetitions of the TB are continued in the same slot and possibly into a subsequent slot.

While the examples described above with regard to FIGS. 3 to 6 pertain to one grant-free transmission occasion per slot, which can be referred to as "slot-based", additional examples described below pertain to the use of multiple grant-free transmission occasions being allocated per slot. Each transmission occasion can be a set of up to L OFDM symbols that are configured for the grant-free allocation. The set of OFDM symbols may be considered a mini-slot. FIGS. 7, 8, 9, 10 and 11 are examples pertaining to mini-slot based repetition, i.e., multiple grant-free transmission occasions can be allocated per slot.

Figure 7:
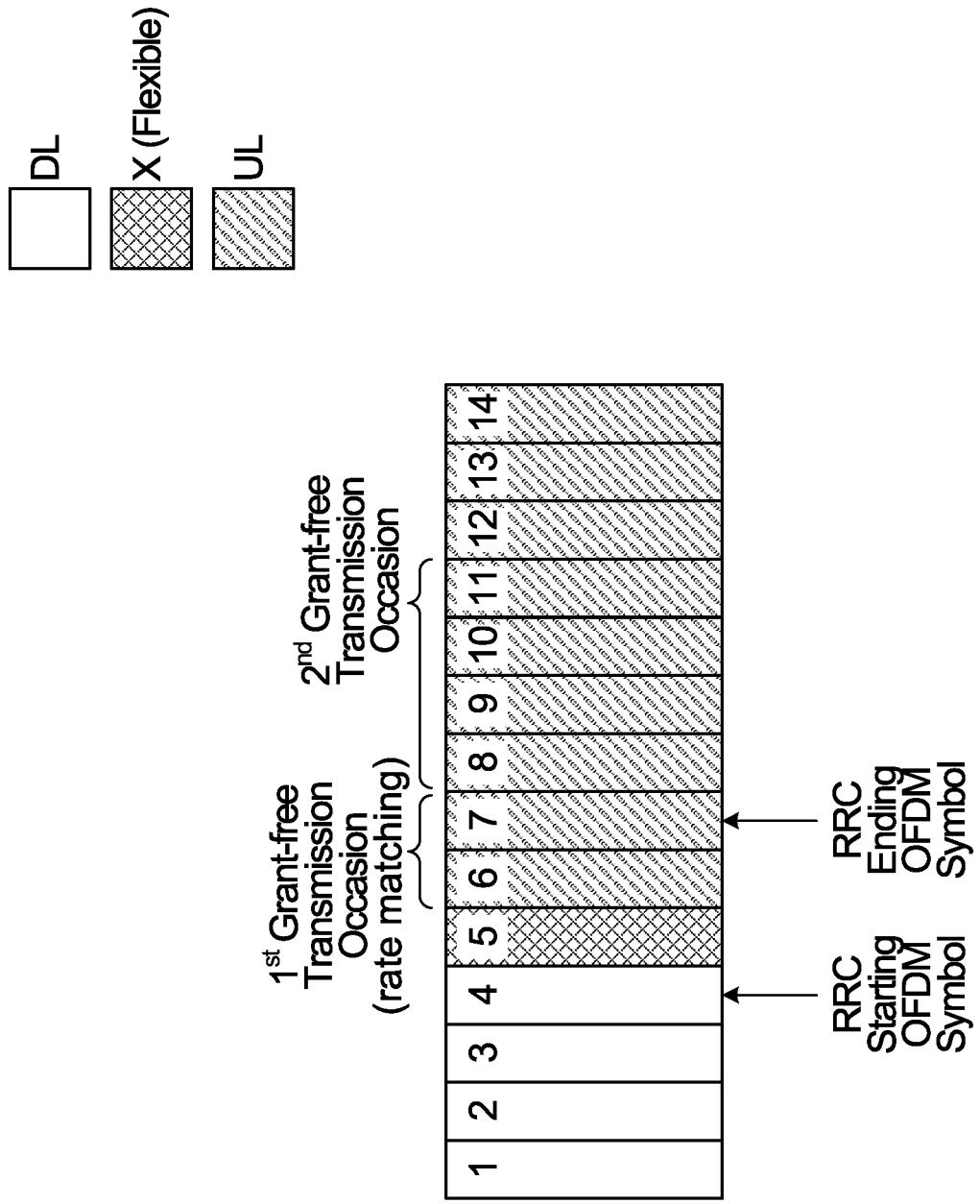
FIG. 7 illustrates an example of a mini-slot based grant-free resource occasion allocation at the OFDM symbol level to avoid conflict of resources.

FIG. 7 illustrates a detailed view of a single slot having 14 OFDM symbols. In FIG. 7, it is indicated that OFDM symbols 4 to 7 were previously allocated for grant-free transmission occasions by RRC signaling. From the result of a UL-DL configuration of slot format, OFDM symbols 1 to 4 are allocated for DL traffic, OFDM symbol 5 is allocated to be flexible and OFDM symbols 6 to 14 are allocated for UL traffic. Since OFDM symbols 4 and 5 were previously allocated as UL grant-free transmission occasions, but are configured in the UL-DL configuration to be DL symbol and flexible symbol, respectively, this becomes a conflict condition for the UE with regard to the UL grant-free allocation.

FIG. 7 illustrates an example manner of dealing with a conflict for mini-slot repetition. In some embodiments, when less than L UL OFDM symbols are available according to the UL-DL configuration in a transmission occasion, the UE will puncture or rate match a transmission occasion to transmit in available UL OFDM symbols according to the UL-DL configuration. In some embodiments, instead of using less than L OFDM symbols in a first transmission occasion, a first set of available L OFDM symbols or a first set of available consecutive L OFDM symbols can be used as the first transmission occasion. In both embodiments, for the remaining K−1 transmission occasion, each TO is the L consecutive symbols immediately following the previous transmission occasion (as in FIG. 5). If there are conflict with the following TOs, they can also be punctured/rate matched.

FIG. 7 shows how only OFDM symbols 6 and 7 are used from the original grant-free transmission occasion of OFDM symbols 4 to 7 for the first grant-free transmission occasion. As only two OFDM symbols are available to the UE, the UE punctures the information of four OFDM symbols for transmission on the two available OFDM symbols, or rate matches the information for four OFDM symbols for transmission on the two available OFDM symbols.

For a scenario with K transmissions (including repetitions), once the first transmission has been allocated to the first transmission occasion, i.e. OFDM symbols 6 and 7, the remaining K−1 transmission occasions can be allocated in the slot and/or into subsequent slots within the period configured for the UL grant-free traffic. No matter how the first TO is determined, in one embodiment, each of the remaining K−1 transmission occasions includes the L consecutive symbols immediately following the previous transmission occasion. If there are conflict with the following TOs, they can also be punctured/rate matched. In another embodiment, the remaining K−1 transmission occasions may be the L consecutive symbols that are all available UL symbols following the previous transmission occasions. In another words, if one of the symbol is not an available UL symbol, the TO should be further shifted later on a symbol by symbol basis until L consecutive available UL symbols are found. In another embodiment, the remaining K−1 transmission occasions may be the L symbols that are all available UL symbols following the previous transmission occasions, however, the L symbols does not need to be consecutive in time domain. In another words, if one symbol is not an available UL symbol for the TO, the UE can use one available symbol later to get the L available symbols for the transmission. The above postponing rule may also be applicable to the first TO and may also applicable to other scenarios other than the one described in FIG. 7.

With regard to the example of FIG. 7, for the first transmission occasion, the UE performs puncturing to X=2 OFDM symbols. The TBS can be based on X=2 OFDM symbols or L=4 configured OFDM symbols. If X<A (A is a threshold, e.g., A=0 or 1), the transmission occasion can be dropped or omitted, for which additional example will be described below in FIGS. 9 and 10.

For each of the 2nd transmission occasion and the following transmission occasions, the UE determines next continuous L=4 UL OFDM symbols following previous transmission occasions. If the TBS of all the repetitions are kept the same and if the TBS of the first repetition is based on configured L=4 OFDM symbols for grant-free resource allocation, then puncturing/rate matching can be used if the available UL symbols in the following TOs are less than L=4. If TBS of the first transmission occasion determined based on available UL symbols of the first transmission occasion (i.e. based on X=2 OFDM symbols) then in some embodiments, the following transmission occasions are determined based on the next continuous L=4 UL OFDM symbols following previous TOs, then rate matching based on cyclic repetition can be performed i.e. expand X=2 OFDM symbols to available 4 OFDM symbols. In other embodiments, the TBS of the first transmission occasion and the subsequent repetitions are based on X=2 OFDM symbols, where X is the available UL symbol for the first transmission occasion and the following transmission occasions, each of which is determined based on the next continuous X UL OFDM symbols following previous transmission occasions.

Figure 8A:
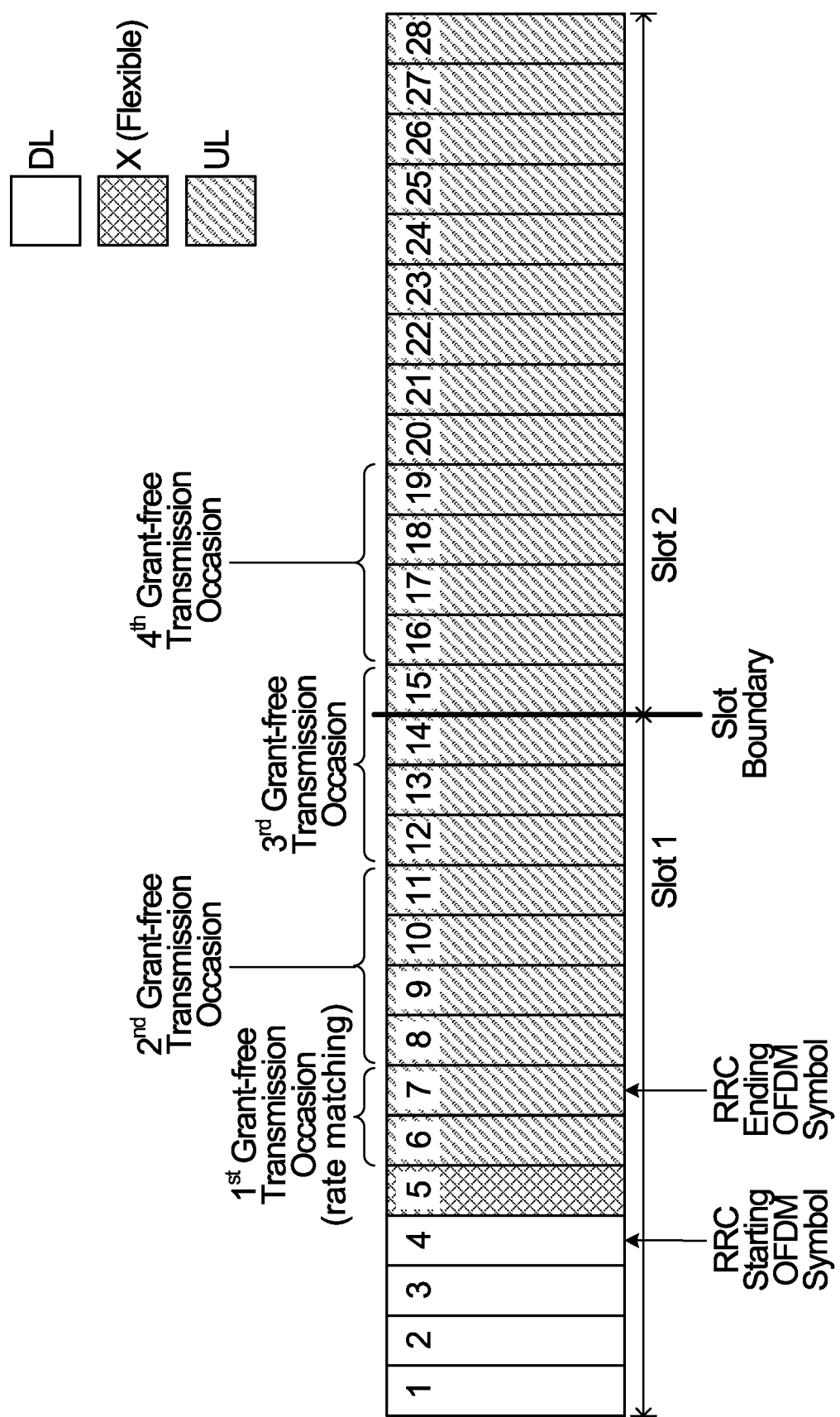
FIGS. 8A, 8B and 8C illustrate examples of a mini-slot based grant-free resource occasion allocation at the OFDM symbol level pertaining to slot boundaries.
Figure 8B:
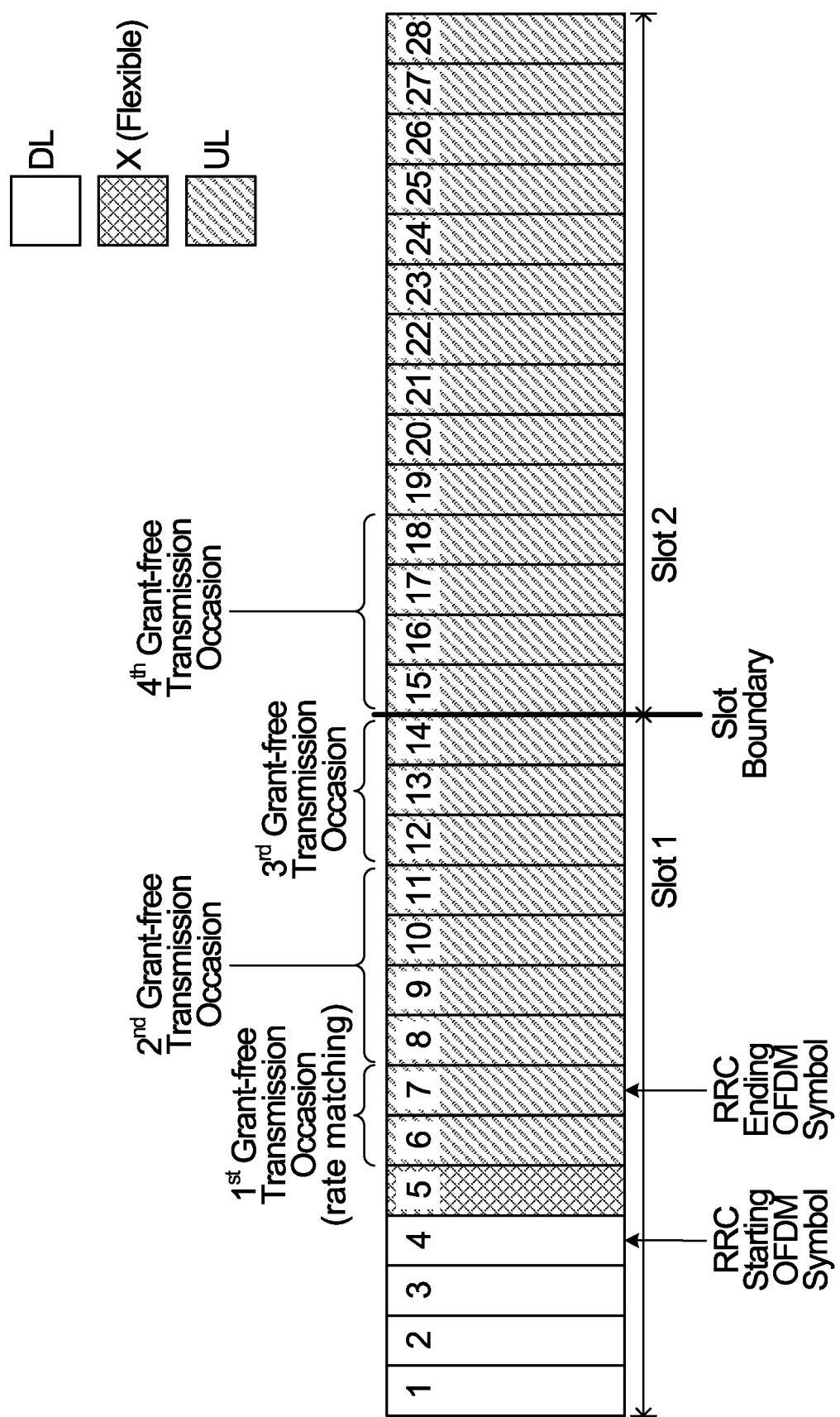
Figure 8C:
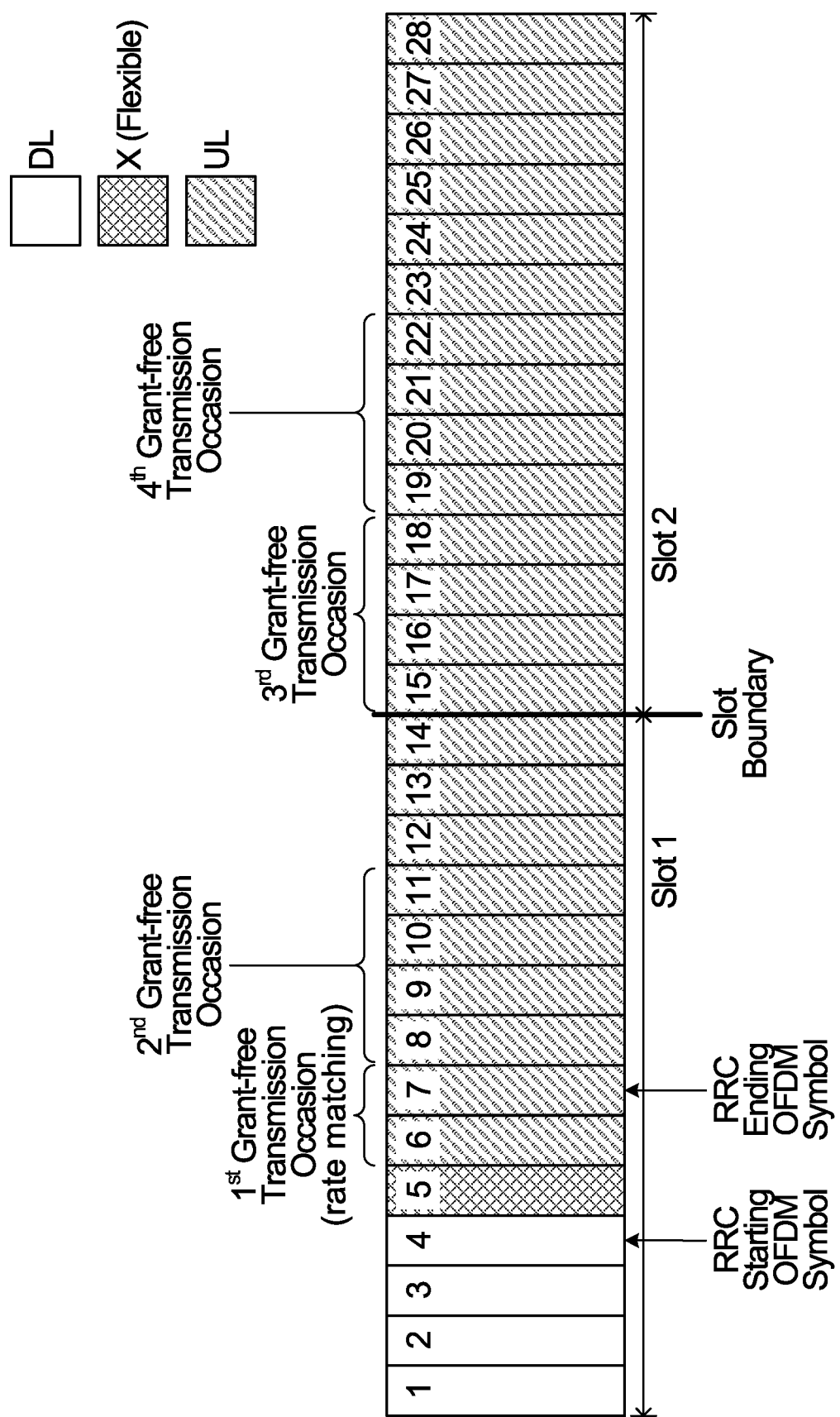

FIGS. 8A, 8B and 8C illustrate examples of different ways that boundaries may be crossed between slots to provide the K transmission occasions in a min-slot based repetition scheme as opposed to the one grant-free transmission occasion per slot scheme described above with regard to the examples of FIGS. 3 to 7.

For the mini-slot repetition, the first TO may be punctured to the available UL symbols in conflict as in FIG. 8A or the first TO may be postponed to the next L consecutive UL symbols, or just the next L available UL symbols, where L is the configured number of OFDM symbols for the grant-free transmission as described for FIG. 5 and FIG. 7. Note that FIGS. 8A, 8B and 8C only show the first TO being punctured/rate matched to the available UL symbols according to the UL-DL configuration, however, the same rule can be applied if the first TO is postponed. The following up to K−1 TOs for the repetition of the same TB for mini-slot based repetition may be based on the L symbols immediately following the previous TO, or may be based on the next L consecutive available UL symbols, or the next L available UL symbols that are not necessarily consecutive following the previous TOs, where L is the configured number of symbols for grant-free transmission.

FIG. 8A shows two adjacent slots, each having 14 OFDM symbols, for a total of 28 OFDM symbols. In FIG. 8A, it is indicated that OFDM symbols 4 to 7 of the first slot were previously allocated for grant-free transmission occasions. From the result of UL-DL configuration of slot format, OFDM symbols 1 to 4 of the first slot are allocated for DL traffic, OFDM symbol 5 of the first slot is allocated to be flexible, and OFDM symbols 8 to 14 of the first slot and OFDM symbols 15 to 28 of the second slot are allocated for UL traffic. The first UL grant-free transmission occasion is allocated in a similar manner to FIG. 7. The second UL grant-free transmission occasion is allocated as OFDM symbols 8 to 11 of the first slot. The third UL grant-free transmission occasion is allocated as OFDM symbols 12 to 14 of the first slot and OFDM symbol 15 of the second slot. The fourth UL grant-free transmission occasion is allocated as OFDM symbols 16 to 19 of the second slot. In this example, a transmission occasion (the third UL grant-free transmission occasion in the example of FIG. 8A) is allowed to cross a slot boundary and be transmitted on OFDM symbols in two slots.

FIG. 8B shows two adjacent slots, each having 14 OFDM symbols. In FIG. 8B, the first two UL grant-free transmission occasions are allocated in the same manner as in FIG. 8A, but the third and fourth UL grant-free transmission occasions are allocated somewhat differently with regard to the first slot/second slot boundary. The third UL grant-free transmission occasion is allocated as only OFDM symbols 12 to 14 of the first slot. This means that there are only three OFDM symbols being used. In such a case, rate matching or puncturing can be used when transmitting the grant-free traffic on this transmission occasion. The fourth UL grant-free transmission occasion is allocated as OFDM symbols 15 to 18 of the second slot. In this example, a transmission occasion is not allowed to cross a slot boundary and a transmission occasion (the third UL grant-free transmission occasion in FIG. 8B) can use an abbreviated number of OFDM symbols by rate matching or puncturing.

FIG. 8C shows two adjacent slots, each having 14 OFDM symbols. In FIG. 8C, the first two UL grant-free transmission occasions are allocated in the same manner as in FIG. 8A, but the third and fourth UL grant-free transmission occasions are allocated somewhat differently with regard to the first slot/second slot boundary. The final three OFDM symbols of the first slot are not used as a possible transmission occasion. The third UL grant-free transmission occasion is allocated as OFDM symbols 15 to 18 of the second slot. The fourth UL grant-free transmission occasion is allocated as OFDM symbols 19 to 12 of the second slot. In this example, a transmission occasion is not allowed to cross a slot boundary and a number of OFDM symbols at the end of a slot may be omitted, but the next sequential transmission occasion is not dropped, and it occurs in the start of the next slot.

FIGS. 8A, 8B and 8C show the first TO is punctured/rate matched, however, the same example can be applicable if the first TO is also updated, in case of conflict, by finding the next L available consecutive OFDM symbols by delaying symbol by symbol starting at the configured L OFDM symbols.

Figure 10:
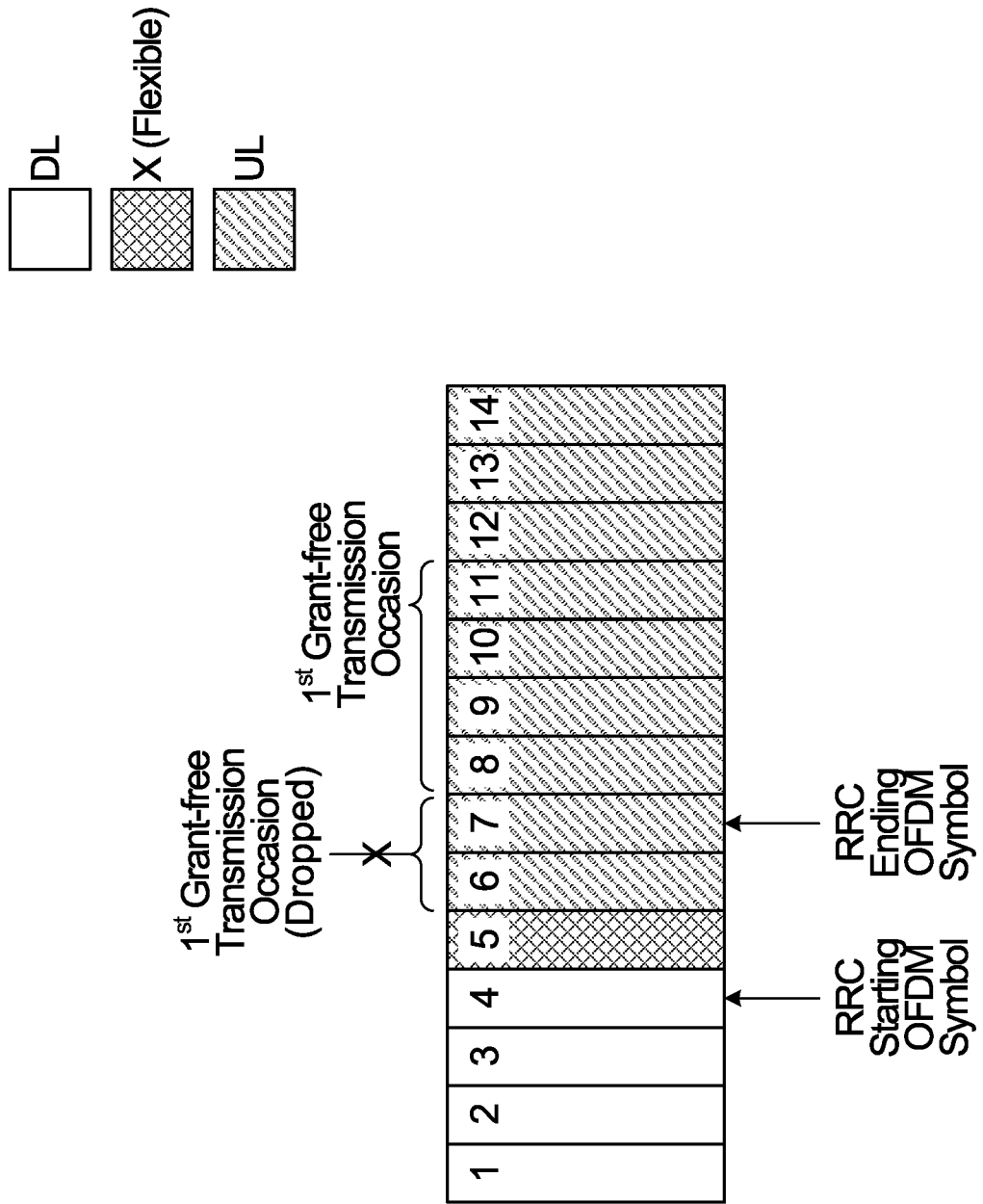
FIG. 10 illustrates a further example of a mini-slot based grant-free resource occasion allocation at the OFDM symbol level to avoid conflict of resources.

FIGS. 9 and 10 illustrate two additional examples of a mini-slot based scheme. In FIG. 7, OFDM symbols 6 and 7 that were originally allocated as a first UL grant-free transmission occasion for grant-free traffic is used for a first transmission, and subsequent transmission occasions were allocated thereafter in the same slot. In FIG. 9, instead of using OFDM symbols 6 and 7, those symbols, although available for UL traffic, are not used, and as a result, the originally allocated first transmission occasion is not used for UL grant-free traffic. The next transmission occasion, that is OFDM symbols 8 to 11, are allocated as the second transmission occasion for a first repetition transmission of a UL grant-free retransmission. The remaining transmission occasions for the remaining repetition transmissions, up to K−2, are included thereafter, if they fit within the period.

In FIG. 10, instead of using OFDM symbols 6 and 7, those symbols, although available for UL grant-free transmission, are not used. The first transmission occasion used for a first UL grant-free transmission is OFDM symbols 8 to 11. The remaining transmission occasions, up to K−1, are included thereafter, if they fit within the period for K−1 repetition transmissions. The examples of FIGS. 9 and 10 are similar in that they both omit the use of available UL OFDM symbols that were previously allocated for a first UL grant-free transmission occasion, but differ as to whether the dropped TO is not counted as one of the K TOs, where the TO is postponed (FIG. 10) and thus is not counted as one of the K TOs, or the TO is dropped and counted as one of the K TOs so that less than K TOs are available after dropping (as shown with respect to FIG. 9).

In a particular example, even though K, the number of repetitions configured by the network, is equal to 4, only a total of 3 repetition transmissions can be performed for the TB, which uses the $2^{nd}$, $3^{rd}$ and $4^{th}$ transmission occasion of the previously allocated grant-free transmission occasions as the updated grant-free transmission occasions for the actual grant-free transmission. In such an example, the indices in the RV sequence are mapped to the actual number of repetitions that is performed. For an RV sequence={0 2 3 1} and K=4, when the first transmission occasion is dropped, the first three RV sequence indices {0 2 3} are mapped to the three updated grant-free transmission occasions. In this example, if the UE has UL grant-free traffic that arrives before the first transmission occasion, the UE can only perform 3 repetitions of the TB at in the three transmission occasions using RV sequence {0 2 3}, respectively. In another example, if after dropping the TO, an extra TO is used to obtain K TOs for the same TB, the RV sequence may be mapped to the new K TOs, in which case, the RV sequence is {0 2 3 1} mapped to the new TO.

In another example, when the transmission occasion is dropped/omitted, the corresponding RV index is also dropped/omitted from the RV sequence/pattern. In such an example, the RV sequence is mapped to the previously allocated grant-free transmission occasions (in this example, the original continuous transmission occasions). For a RV sequence {0 2 3 1} and K=4, when the first transmission occasion is dropped or omitted, the remaining RV sequence indices {2 3 1} are mapped to the remaining three transmission occasions, respectively.

Figure 11:
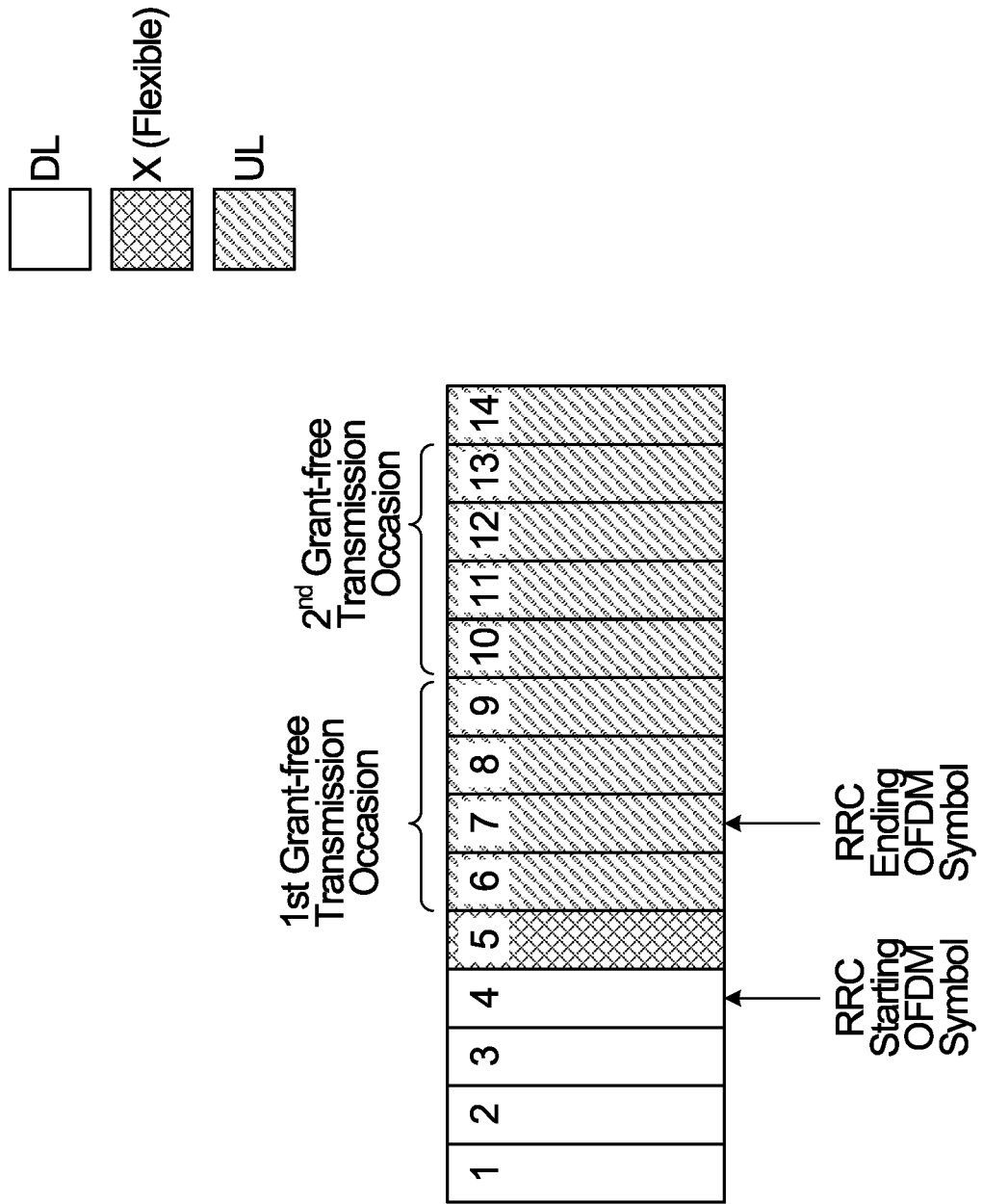
FIG. 11 illustrates yet another example of a mini-slot based grant-free resource occasion allocation at the OFDM symbol level to avoid conflict of resources.

FIG. 11 illustrates another example of a mini-slot based scheme. In some embodiments, instead of using only an available number of OFDM symbols that is less than L as a transmission occasion, a first set of L OFDM symbols can be used as a transmission occasion. In the example of FIG. 11, instead of using only OFDM symbols 6 and 7 from a previously allocated first UL grant-free transmission occasion, the first grant-free transmission occasion includes those two OFDM symbols, as well as the subsequent two OFDM symbols, OFDM symbols 8 and 9, for a total of K=4 OFDM symbols. The first UL grant-free transmission occasion is effectively shifted, or postponed, to the first available set of L OFDM symbols that have been configured for UL traffic. The next transmission occasion, that is OFDM symbols 10 to 13, are allocated as the second transmission occasion for transmission of a first repetition transmission. The remaining transmission occasions, up to K−2, are included thereafter, if they fit within the period. If the new updated transmission occasion exceeds the current period, it may be dropped.

With reference to FIG. 11, for a $1^{st}$ transmission occasion, the UE determines the next available set of L OFDM symbols. For the $2^{nd}$ transmission occasion, the UE determines the next available set of L OFDM symbols. After the $1^{st}$ transmission occasion, if the n-th transmission occasion has less than L UL OFDM symbols, the UE can use transmission occasions that are consistent with the boundary conditions of the examples described above in FIGS. 8A, 8B and 8C.

It should be understood that the manner of handling a slot boundary for transmission occasions of grant-free repetitions subsequent to the first transmission, in scenarios similar to the examples of FIGS. 9 to 11, can be similar to the examples of transmission occasions of grant-free repetitions subsequent to the first transmission as described above with regard to FIGS. 8A, 8B and 8C.

The examples that are described below in FIGS. 3 to 7, 8A, 8B, 8C and 9 to 11 are all based on UL grant-free transmission occasions having L OFDM symbols, where L is four OFDM symbols, in slots that have 14 OFDM symbols. The number of grant-free transmission occasions K allocated in a single period is four, i.e. a first grant-free transmission and 3 additional repetitions. The values of L and K, while the same, respectively, for the various examples described in the application are understood not to be limited by these examples.

The available number of UL OFDM symbols for a given transmission occasion in a particular slot may be L OFDM symbol or less depending on if there are any conflicts. In a particular example for L=4, when less than 4 OFDM symbols are available, the UE makes a decision as to whether utilizing the less than four symbols for the transmission occasion, by rate matching or puncturing, or not using the less than four OFDM symbols and awaiting the next set of four OFDM symbols in a subsequent transmission occasion, where the next set of four OFDM symbols are for a second or third repetition, or not using the less than four OFDM symbols as part of a set of four OFDM symbols, but using the less than four OFDM symbols plus additional OFDM symbols to form a set of four OFDM symbols that form a new first transmission occasion.

In the examples above, only the first grant-free transmission occasion was affected by the UL-DL configuration. In this case, only the transmission occasion with index 1 was affected. However, it is possible that the number of transmission occasions is different than K=4, for example K=8, and a different number of transmission occasions, for example, the first, second and third transmission occasions (corresponding to indices 1, 2 and 3 of the RV sequence), are reconfigured, which results in a conflict for UL grant-free transmission.

In the examples above described with regard to FIGS. 3 to 7 and 9 to 11, it is determined how a conflict may be resolved. In some embodiments, when there are fewer UL OFDM symbols (denoted by X) available according to UL-DL configuration in a previously allocated first grant-free transmission occasion than the configured L OFDM symbols, a decision has to be made between options such as (i) use the fewer than L OFDM symbols and rate match or puncture an UL transmission on the available X OFDM symbols, (ii) omit the available UL OFDM symbols from the previously allocated first transmission occasion that are configured to be used for UL grant-free transmission, and postpone to the next previously allocated transmission occasion (which can be used for a first GF transmission occasion (i.e. mapped to the first index of RV sequence) or second GF transmission occasion (i.e. mapped to the second index of RV sequence)), or (iii) instead of using only the fewer than L OFDM symbols available from the previously allocated first transmission occasion that are configured to be used for UL grant-free transmission, use the first available L OFDM symbols as a first transmission occasion starting with an OFDM symbol that was part of a previously allocated transmission occasion, such that the new first transmission occasion includes OFDM symbols that may not be completely overlap with one of the previously allocated grant-free transmission occasions.

The decision of whether to use any of puncturing/rate matching, postponing or dropping and how to do RV mapping to resolve the conflict may be made in part based on one or more of the following conditions. In one embodiment, in the case where the number X of available UL OFDM symbols for a GF TO is less than the configured number L of symbols, but the X available UL OFDM symbols are still enough for an UL transmission (e.g. X>A, where A is a threshold and can be 0, or 1), the decision that whether to do a puncturing/rate matching or dropping/postpone to resolve the conflict may be made in part based on one or more of the following conditions. A first condition may be the value of the index of the transmission occasion. For example, the first GF TO that corresponds to RV0 may be more important for reliability. If it is punctured or rate matched to less than L OFDM symbols, the reliability may be compromised. Therefore, postponing or dropping for this TO may be chosen instead of puncturing or rate matching.

A second condition may be the RV index corresponding to the GF TO. For example, the GF TO corresponding to RV0 may be more important than other RVs for the reliability. RV0 can usually be self-decodable. Therefore, in the case of available UL OFDM symbols X<the configured L symbol for a GF TO corresponding to RV0, UE can postpone the GF TO instead of puncturing/rate matching.

A third condition may be the values of the configured RV sequence. The decision may be dependent on which RV sequence is assigned. For example, UE may behave differently when the RV sequence is {0 2 3 1} than when the RV sequence is {0 0 0}.

In a particular example when the RV sequence is {0 2 3 1}, the transmission occasions with respect to RV index "0" should not be punctured or rate matched if there is a conflict. Alternatively, the first GF transmission occasion should not be punctured or rate matched if there is a conflict (but other TO may be punctured or rate matched). In other words, for the first transmission occasion, a UE may use postpone or dropping solution to resolve the conflict, while for other transmission occasions, the UE may use puncturing/rate matching first if it can be done. The transmission occasion should be maintained as L symbols for reliability. If the first transmission occasion has X available UL OFDM symbols and X<L, where L is the configured number of OFDM symbols for the transmission occasion, this is considered a conflict and allocation of the transmission occasion should be postponed or dropped. All the postponing solutions described in the disclosure can be applied here. For example, in a slot based repetition scheme, the UE may postpone the transmission occasion to the next slot or drop the transmission occasion as described from FIG. 3A and FIG. 3B if there is conflict. The RV sequence should be mapped to the new transmission occasion after postpone/drop, i.e., the postponed transmission occasion is mapped to RV 0 instead of RV 2. In some other embodiments, all the RV mapping schemes described in this disclosure after postpone or dropping can also be applied here. Note that the conflict can mean the number of available UL symbols among the configured L symbols of the transmission occasion is less than L (as in FIG. 4) or it can mean the number of available UL symbols in the slot of the transmission occasion after shifting is less than L (as in FIG. 6) or any other conflict conditions described. For all the other transmission occasions (not the first transmission occasion), the UE may do puncturing/rate matching first if the available UL symbols is enough for a UL transmission in the transmission occasion (e.g. X>=a threshold A (e.g., A=0, or 1)) and postpone or drop if not enough UL symbols available for a transmission (e.g., X<A). For mini-slot based repetition, the first transmission occasion in conflict can be postponed to a next set of available L UL OFDM symbols or next set of available L consecutive OFDM symbols, or the next previously allocated transmission occasion. When postponed to the next previously allocated transmission occasion, the omitted transmission occasion may or may not count as one of the K transmission occasions. When the omitted transmission is not count as one of the K transmission occasion, more transmission occasion can be added to obtain K transmission occasion if it is available within the period. In other words, the transmission occasion can be postponed as in FIG. 10 on a transmission occasion basis (postpone to the next transmission occasion of the original configured grant-free transmission occasion) or shifted symbol by symbol to find the next L consecutive symbols as in FIG. 11. For all other transmission occasions other than the first transmission occasion, the transmission occasion may be punctured/rate matched to the available UL symbols (e.g. X>=a threshold A (e.g., A=0, or 1)) and postpone or drop if not enough UL symbols available for a transmission (e.g., X<A). For grant-free repetitions corresponding to the RV sequence {0 2 3 1}, the starting position of the initial transmission of the TB can only be on the first transmission occasion, in other words, the initial transmission of the TB can only start at the first transmission occasion. If the first transmission occasion is postponed, the starting position of the initial transmission can only happen at the postponed first transmission occasion, which is still mapped to RV 0 and can be at a different location than the originally allocated first grant-free transmission occasion.

If the RV sequence is {0 3 0 3}: in some embodiments, any transmission occasion of the K repetitions that are associated with RV index "0" should not be punctured/rate matched if there is conflict. In this case, the starting position of the initial transmission of a TB can be at any of the transmission occasions of the K repetitions that are associated with RV 0 (RV=0). Alternatively, in other embodiments, only the first transmission occasion of the K repetitions cannot be punctured if there is a conflict. The starting position for an initial grant-free transmission of a TB can only be at any of the transmission occasions of the K repetitions that are associated with RV 0 (RV=0) that is not punctured/rate matched. In other words, the initial transmission of a TB can only be at a transmission occasion associated with RV 0 that uses the full L available OFDM symbols for the transmission as configured for GF transmission. Other operation rules are similar to the rules described for RV sequence {0 2 3 1} above and are omitted here for notational simplicity.

If the RV sequence is {0 0 0 0}, then there are various options. In some embodiments, all of the transmission occasions of the K repetitions can be punctured. In this case, the starting position of the initial transmission of the TB cannot be on a TO that is punctured/rate matched. For example, the starting position of the initial transmission of a TB may be on any of the TO that is not punctured/rate matched after resolving the conflict except the last transmission occasion when K=8. In some embodiments, the first transmission occasion of the K repetitions should not be punctured/rate matched. In this case, the starting position of the initial transmission of the TB cannot be on a TO that is punctured/rate matched. For example, the starting position of the initial transmission of a TB may be on any of the TO that is not punctured/rate matched after resolving the conflict except the last transmission occasion when K=8. In some embodiments, all of the transmission occasions should not be puncture/rate matched, and the starting position of the initial transmission of the TB may be on any of the TO except the last transmission occasion when K=8.

A fourth condition may be how the RV sequence indices are mapped to the UL grant-free transmission occasions.

In some embodiments, the RV sequence is mapped to align with the originally allocated UL grant-free transmission occasions. If an RV sequence of {0 2 3 1} is contemplated, and if the number of available OFDM symbols in the first TO is less than the number L of configured OFDM symbols, all transmission occasions in a current period are dropped. If an RV of {0 3 0 3} is contemplated, and if the number X of available OFDM symbols is less than L of configured OFDM symbols, for a transmission occasion associated with RV index "0", both the TO associated with RV "0" and following RV "3" will be dropped. If an RV sequence of {0 0 0 0} is contemplated, only previously allocated transmission occasions that are in conflict are omitted.

In some embodiments, if a puncturing method is adopted as shown in the example of FIG. 5, if X<L, and it is the first transmission occasion, or based on the RV specific puncturing criteria, the transmission occasion should be dropped or postponed to the next slot.

In some embodiments, if shift (and puncturing) is adopted as shown in the example of FIG. 6, if the available symbols in a slot X<L, and based on the RV specific puncturing criteria, the transmission occasion cannot be punctured, then the transmission occasion should be dropped or postponed to next slot.

In the case of resolving the conflict, the UE decides whether to do puncturing or postpone/drop/omit OFDM symbols of a transmission occasion, for a mini-slot or a slot based repetition, based on at least one of the following conditions/parameters: the index of the transmission occasion, the configured RV sequence, and the RV index mapped to the transmission occasion.

In some embodiments, transmitting a grant-free transmission on a new set of UL resources includes at least the following operations: puncturing/rate matching the resource from the original L configured OFDM symbols to the available X OFDM symbols not in conflict; drop the current transmission occasion; postpone the transmission occasion; or postpone the transmission occasion until the end of a slot or the grant-free period and then puncturing or dropping.

Puncturing/rate matching may include: 1) determining a transport block size (TBS) and 2) rate matching to the available X UL OFDM symbols given the determined TBS. The TBS may be determined based on the configured MCS and the time-frequency resources derived based on Y UL OFDM symbols. The value of Y can be L; the available X symbols in the first transmission occasion; or the minimum value of each of the K transmission occasions, i.e., $\min(X_1, X_2, \ldots, X_K)$, where $X_i$ is the available OFDM symbols for the ith transmission occasion ($1<=i<=K$). The puncturing/rate matching of ith transmission occasion may further include: puncturing/rate matching if $X_i<Y$, and cyclic repetition if $X_i>Y$.

Dropping the current transmission occasion does not affect the transmission allocation of the following transmission occasions for the same transmission block (TB). In some embodiments, dropping includes dropping the transmission occasion index and mapping the RV sequence to the original configured K TOs. In some embodiments, dropping includes dropping the transmission occasion, remapping the RV sequence to the new H transmission occasions, where H<K is the number of transmission occasions excluding the dropped transmission occasions.

Deciding whether to postpone/drop/omit in the case of conflict may include, if the transmission occasion is either a first transmission occasion or a transmission occasion associated with an RV sequence value equal to "0", performing postponing/dropping/omitting, and performing puncturing in other cases. The starting position of an initial transmission of K repetitions should not be in a transmission occasion that is punctured.

Postponing the transmission occasion means the number of transmission occasions are not reduced after postponing, and the RV sequence is mapped to the new transmission occasion index, not the original allocated K resources. If only a number H, where H<K transmission occasions can be found within a time window defined by the periodicity after postponing, UE drop the last K-H transmission occasions.

Postponing a transmission occasion may include: postponing on an OFDM symbol level, which involves moving the transmission occasion symbol by symbol until no conflict occurs, i.e. a set of L available continuous available UL OFDM symbols; postponing on a slot level, which involves moving the transmission occasion slot by slot until a transmission occasion with no conflict is found; postponing on a transmission occasion level, which involves moving to the next transmission occasion, i.e. for a mini-slot with L=4 configured OFDM symbols, move to the next available 4 UL OFDM symbols.

In some embodiments, when there is conflict between grant-free resources and control signaling and measurement, grant-free signaling may exclude symbols used for control signaling and take priority over measurement signals.

In some embodiments, an unknown symbol may be treated as not usable for grant-free without a DCI override. In some embodiments, a last UL symbol may be excluded for grant-free use for uplink control information (UCI).

Figure 12:
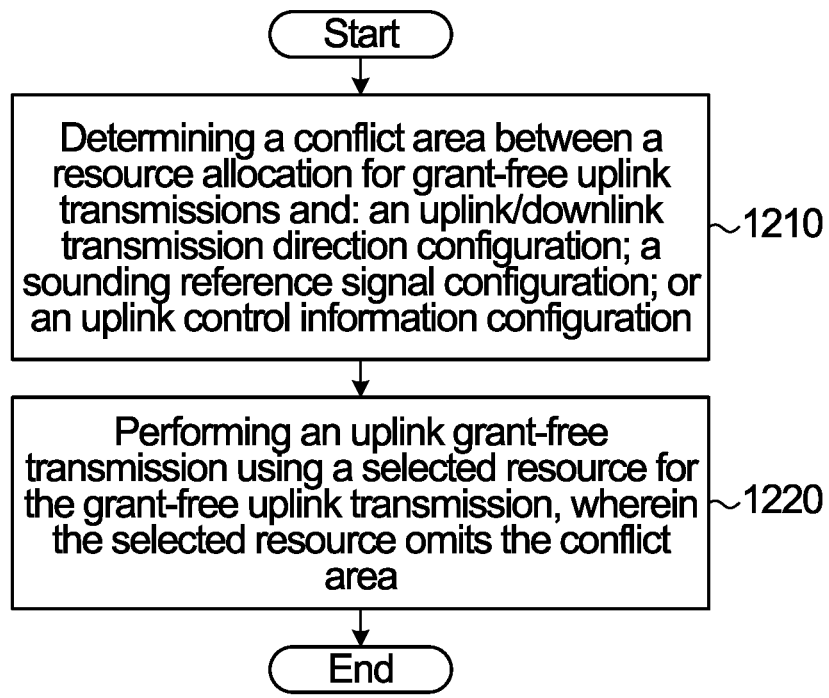
FIG. 12 illustrates a flowchart of an example grant-free transmission scheme.

FIG. 12 illustrates an embodiment method involving a step 1210 of determining a conflict area between a resource allocation for grant-free uplink transmissions and one or more of: an uplink/downlink transmission direction configuration; a sounding reference signal configuration; or an uplink control information configuration. Step 1210 may also include determining that the grant-free transmission is scheduled in a resource that is not allocated for an UL transmission.

A further step 1220 involves performing an uplink grant-free transmission using a selected resource for the grant-free uplink transmission, wherein the selected resource omits the conflict area.

Step 1220 may also include determining a first available transmission occasion in an UL transmission resource that can be used for grant-free uplink transmission. Step 1220 may also include determining up to K−1 additional transmission occasions in the UL transmission resource.

In some embodiments, determining a first available transmission occasion and determining up to K−1 additional transmission occasions involves omitting at least some of the K transmission occasions for use in grant-free transmission if there are less than L OFDM symbols that are configured for use in the grant-free transmission available for the grant-free transmission within a given time duration defining a periodicity of grant-free transmission. Omitting at least some of K transmission occasions for grant-free transmission may involve omitting one or more of the first available transmission occasion for grant-free transmission; or one or more of the K−1 additional transmission occasions for grant-free transmission.

In some embodiments, when a number X of available OFDM symbols in one of the K transmission occasions, wherein X is an integer value >1, is less than a threshold of OFDM symbols that can be used for a grant-free allocation, selecting a new first available transmission occasion in the UL that has a number of OFDM symbols that is greater than the threshold of OFDM symbols.

In some embodiments, when a number X of available OFDM symbols in one of the K transmission occasions, wherein X is an integer value >1, is greater than a threshold of OFDM symbols that can be used for a grant-free allocation, but less than a number L of configured OFDM symbols for the one of the K transmission occasions, wherein L is an integer value >1, using rate matching when transmitting on the one of the K transmission occasions allocated for grant-free transmission. Rate matching may include one of puncturing or cyclic repetition of the X OFDM symbols in the L configured OFDM symbols for the grant-free transmission.

In some embodiments, a number of Y OFDM symbols used to define a transport block size for each of the K transmission occasions is equal to (i) a number of available OFDM symbols in the first available transmission occasion, or (ii) a minimum number of available OFDM symbols in any of the first available transmission occasion and the K−1 additional transmission occasions.

Figure 13:
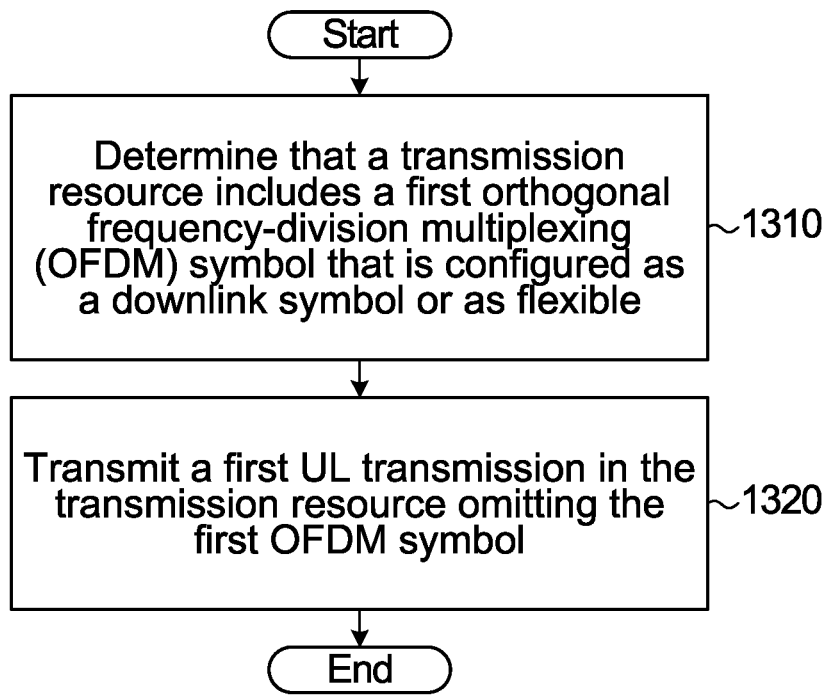
FIG. 13 illustrates a diagram of an example method for wireless communications.

FIG. 13 illustrates a diagram of an embodiment method 1300 for wireless communications. The method 1400 may be indicative of operations at a UE. As shown, at step 1310, the UE determines that a transmission resource includes a first orthogonal frequency-division multiplexing (OFDM) symbol that is configured as a downlink symbol or as flexible. The transmission resource is allocated for uplink (UL) transmissions during a time duration, and includes K transmission occasions (TOs), where K is an integer greater than 1. At step 1320, the UE transmits a first UL transmission in the transmission resource omitting the first OFDM symbol. The first UL transmission includes K repetitions to be transmitted in the respective K TOs, and the K repetitions includes an initial transmission and at least one retransmission of the initial transmission.

Figure 14:
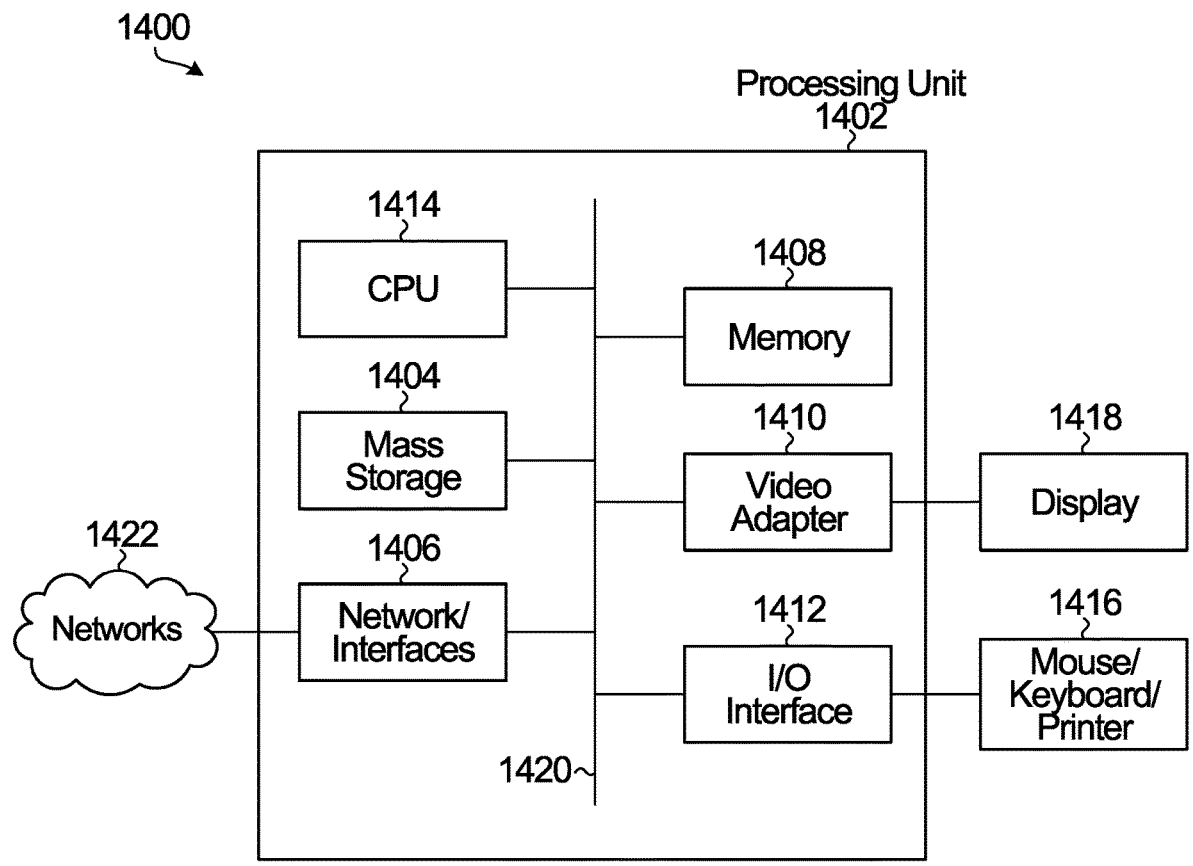
FIG. 14 illustrates a diagram of a computing system according to an embodiment of the disclosure.

FIG. 14 is a block diagram of a computing system 1400 that may be used for implementing the devices and methods disclosed herein. For example, the computing system can be any entity of a UE, access node (AN), MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1402, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1402 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse/keyboard/printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, and/or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

The following embodiments are also provided.

In accordance with an embodiment of the present disclosure, there is provided a method for grant-free uplink transmission, the method comprising: determining a conflict area between a resource allocation for grant-free uplink transmissions and: an uplink/downlink transmission direction configuration; a sounding reference signal configuration; or an uplink control information configuration; and performing an uplink grant-free transmission using a selected resource for the grant-free uplink transmission, wherein the selected resource omits the conflict area.

In some embodiments, determining the conflict area comprises determining that the grant-free transmission is scheduled in a resource that is not allocated for an UL transmission.

In some embodiments, performing the uplink grant-free uplink transmission comprises determining a first available transmission occasion in an UL transmission resource that can be used for grant-free uplink transmission.

In some embodiments, the method further comprises determining up to K−1 additional transmission occasions in the UL transmission resource.

In some embodiments, the K−1 additional transmission occasions are determined on a one transmission occasion per slot basis, wherein a slot includes M orthogonal frequency division multiplexed (OFDM) symbols, wherein M is an integer value >1, and each transmission occasion includes up to L OFDM symbols, wherein L is an integer value >1.

In some embodiments, the K−1 additional transmission occasions are determined on a more than one transmission occasion per slot basis, wherein a slot includes M OFDM symbols, wherein M is an integer value >1, and each transmission occasion includes up to L OFDM symbols, wherein L is an integer value >1.

In some embodiments, determining a first available transmission occasion and determining up to K−1 additional transmission occasions comprises: omitting at least some of the K transmission occasions for use in grant-free transmission if there are less than L OFDM symbols that are configured for use in the grant-free transmission available for the grant-free transmission within a given time duration defining a periodicity of grant-free transmission.

In some embodiments, omitting at least some of K transmission occasions for grant-free transmission comprises omitting one or more of: the first available transmission occasion for grant-free transmission; or one or more of the K−1 additional transmission occasions for grant-free transmission.

In some embodiments, the method further comprises: when a number X of available OFDM symbols in one of the K transmission occasions, wherein X is an integer value >1, is less than a threshold of OFDM symbols that can be used for a grant-free allocation, selecting a new first available transmission occasion in the UL that has a number of OFDM symbols that is greater than the threshold of OFDM symbols.

In some embodiments, the method of further comprises, when a number X of available OFDM symbols in one of the K transmission occasions, wherein X is an integer value >1, is greater than a threshold of OFDM symbols that can be used for a grant-free allocation, but less than a number L of configured OFDM symbols for the one of the K transmission occasions, wherein L is an integer value >1, using rate matching when transmitting on the one of the K transmission occasions allocated for grant-free transmission.

In some embodiments, rate matching includes one of puncturing or cyclic repetition of the X OFDM symbols in the L configured OFDM symbols for the grant-free transmission.

In some embodiments, a number of Y OFDM symbols used to define a transport block size for each of the K transmission occasions is equal to (i) a number of available OFDM symbols in the first available transmission occasion or (ii) a minimum number of available OFDM symbols in any of the first available transmission occasion and the K−1 additional transmission occasions.

In some embodiments, a redundancy version (RV) sequence mapped to K transmission occasions is modified when less than K transmission occasions are allocated for grant-free transmission.

In some embodiments, when less than K transmission occasions are allocated for grant-free transmission, aligning a mapping of K-J indices of the RV sequence, wherein J equals the number of transmission occasions less than K, with the K-J transmission occasions.

In some embodiments, aligning the mapping comprises: omitting one or more transmission occasions at the beginning of a period and omitting corresponding RV sequence indices based on an ordered mapping between transmission occasions and RV sequence indices; or omitting one or more transmission occasions at the beginning of a period and maintaining a mapping of the RV sequence indices in order despite omitting the RV sequence indices.

In some embodiments, the RV sequence is one of: {0,2,3,1}; {0,3,0,3}; or {0,0,0,0}.

In some embodiments, for a given slot, when a transmission occasion of the K transmission occasions has less than L OFDM symbols available to be allocated in the given slot, performing the uplink grant-free transmission in a subsequent slot.

In some embodiments, for a given slot, when a transmission occasion of the K transmission occasions has less than L OFDM symbols available to be allocated in the slot, allocating the less than L OFDM symbols for the transmission occasion in the given slot and allocating any additional of the K transmission occasions in a subsequent slot.

In some embodiments, performing an uplink grant-free transmission using a selected resource for the grant-free uplink transmission comprises determining whether to perform: puncturing of a transmission to transmit on a number of available OFDM symbols that is less than a number of allocated OFDM symbols; or postponing a transmission by omitting OFDM symbols and as a result transmit on a number of available OFDM symbols that is equal to a number of allocated OFDM symbols.

In some embodiments, determining whether to perform puncturing of a transmission or postponing a transmission by omitting OFDM symbols is based on at least one of: an index of the transmission occasion, the values of a configured redundancy version (RV) sequence; and manner in which the RV index is mapped to a transmission occasion.

In accordance with an embodiment of the present disclosure, there is provided an user equipment (UE) configured for grant free transmissions, the UE comprising: a processor; and a computer readable storage medium storing programming instructions for execution by the processor, the programming including instructions to: determining a conflict area between a resource allocation for grant-free uplink transmissions and: an uplink/downlink transmission direction configuration; a sounding reference signal configuration; or an uplink control information configuration; and performing an uplink grant-free transmission using a selected resource for the grant-free uplink transmission, wherein the selected resource omits the conflict area. The UE may be configured to perform other embodiments as described above.

In accordance with an embodiment of the present disclosure, there is provided a method for grant-free uplink transmission, the method comprising: determining a conflict area between a resource allocation for grant-free uplink transmissions and: an uplink/downlink transmission direction configuration; a sounding reference signal configuration; or an uplink control information configuration; and receiving an uplink grant-free transmission using a selected resource for the grant-free uplink transmission, wherein the selected resource omits the conflict area.

In accordance with an embodiment of the present disclosure, there is provided a base station configured for grant free transmissions, the base station comprising: a processor; and a computer readable storage medium storing programming instructions for execution by the processor, the programming including instructions to: determining a conflict area between a resource allocation for grant-free uplink transmissions and: an uplink/downlink transmission direction configuration; a sounding reference signal configuration; or an uplink control information configuration; and receiving an uplink grant-free transmission using a selected resource for the grant-free uplink transmission, wherein the selected resource omits the conflict area.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a mapping unit/module, a re-mapping unit/module, a puncturing unit/module, a rate matching unit/module, a dropping unit/module, an omitting unit/module, a shifting unit/module, a postponing unit/module, and other performing unit/module for performing the step of the above step. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:
   determining, by an apparatus, that a transmission resource includes a first orthogonal frequency-division multiplexing (OFDM) symbol that is configured as a downlink (DL) symbol or as flexible with respect to an uplink (UL) or DL direction, wherein the transmission resource is allocated for UL transmissions during a time duration, and wherein the transmission resource comprises K transmission occasions (TOs), K being an integer greater than 1; and
   transmitting, by the apparatus, a physical uplink shared channel (PUSCH) repetition transmission in the transmission resource omitting the first OFDM symbol configured as the DL symbol or as flexible, wherein the PUSCH repetition transmission comprises one or more repetitions to be transmitted in respective one or more TOs of the K TOs, and the one or more repetitions comprises an initial transmission of the PUSCH repetition transmission and at least one retransmission of the initial transmission.

2. The method of claim 1, wherein the first OFDM symbol is semi-statically configured for a DL transmission.

3. The method of claim 1, wherein the first OFDM symbol is semi-statically configured by a higher-layer parameter comprising a time division duplex (TDD) UL-DL configuration common parameter or TDD UL-DL configuration dedicated parameter.

4. The method of claim 1, wherein the first OFDM symbol is semi-statically configured as flexible or dynamically configured as flexible.

5. The method of claim 1, wherein the first OFDM symbol is semi-statically configured as flexible or dynamically configured for DL transmission.

6. The method of claim 1, wherein the transmitting the PUSCH repetition transmission in the transmission resource omitting the first OFDM symbol comprises:
transmitting, by the apparatus, a repetition in OFDM symbols of a first TO that comprises the first OFDM symbol, omitting the first OFDM symbol.

7. The method of claim 6, further comprising:
performing, by the apparatus, rate matching on the repetition for transmitting the repetition in the OFDM symbols of the first TO.

8. The method of claim 1, wherein each TO is allocated with L consecutive OFDM symbols, and wherein the transmitting the PUSCH repetition transmission in the transmission resource omitting the first OFDM symbol comprises:
transmitting, by the apparatus, a transport block (TB) in OFDM symbols of a first TO, wherein a size of the TB is determined based on the L consecutive OFDM symbols.

9. The method of claim 8, wherein the size of the TB is determined by:
determining a modulation scheme and a target code rate based on a configured modulation and coding scheme (MCS) index;
determining a total number of available resource elements based on L symbols and a number of allocated resource blocks; and
determining the size of TB based on the modulation scheme, the target code rate and the available resource elements.

10. The method of claim 8, wherein the transmitting the TB in the OFDM symbols of the first TO further comprises:
performing rate matching in the OFDM symbols of the first TO by encoding the TB, and mapping the encoded TB to less than L OFDM symbols of the first TO after omitting the first OFDM symbol.

11. The method of claim 8, wherein a starting symbol and length in terms of number of OFDM symbols L of the transmission resource for the first TO of the TB is indicated by a row index of a user equipment (UE)-specific radio resource control (RRC) configured table, and following K−1 TOs for a repetition of the same TB are located in the L consecutive OFDM symbols immediately following a previous TO of the same TB.

12. The method of claim 11, wherein a second TO among the K TOs includes L consecutive symbols that cross a slot boundary between a first slot and a second slot, wherein the second slot is an immediate next slot after the first slot.

13. The method of claim 12, wherein the second TO among the K TOs has fewer than L symbols available before the slot boundary, the method further comprising:
performing, by the apparatus, rate matching on a repetition for transmitting a repetition in the OFDM symbols of the second TO within the first slot; and
transmitting, by the apparatus, the TB in the OFDM symbols of the second TO within the first slot.

14. The method of claim 1, further comprising:
receiving, by the apparatus, a resource configuration indicating the transmission resource, wherein the resource configuration is received in a RRC signaling.

15. The method of claim 1, further comprising:
re-mapping a redundancy version (RV) sequence associated with the K TOs to an actual number of repetitions, the RV sequence comprising a plurality of RV indices.

16. The method of claim 1, further comprising:
transmitting a demodulation reference signal (DMRS) at a DMRS location determined based on the OFDM symbols of a first TO after omitting the first OFDM symbol.

17. The method of claim 1, further comprising:
transmitting a DMRS starting in an earliest symbol of the OFDM symbols of a first TO after omitting the first OFDM symbol.

18. A apparatus comprising:
a non-transitory memory storage comprising instructions; and
at least one processor in communication with the non-transitory memory storage, wherein the at least one processor executes the instructions to cause the apparatus to:
determine that a transmission resource includes a first orthogonal frequency-division multiplexing (OFDM) symbol that is configured as a downlink (DL) symbol or as flexible with respect to an uplink (UL) or DL direction, wherein the transmission resource is allocated for UL transmissions during a time duration, and wherein the transmission resource comprises K transmission occasions (TOs), K being an integer greater than 1; and
transmit a physical uplink shared channel (PUSCH) repetition transmission in the transmission resource omitting the first OFDM symbol configured as the DL symbol or as flexible, wherein the PUSCH repetition transmission comprises one or more repetitions to be transmitted in respective one or more TOs of the K TOs, and the one or more repetitions comprises an initial transmission of the PUSCH repetition transmission and at least one retransmission of the initial transmission.

19. A non-transitory computer readable storage medium storing instructions that, when executed by an apparatus, cause the apparatus to perform operations, the operations comprising:
determining that a transmission resource includes a first orthogonal frequency-division multiplexing (OFDM) symbol that is configured as a downlink (DL) symbol or as flexible with respect to an uplink (UL) or DL direction, wherein the transmission resource is allocated for UL transmissions during a time duration, and wherein the transmission resource comprises K transmission occasions (TOs), K being an integer greater than 1; and
transmit a physical uplink shared channel (PUSCH) repetition transmission in the transmission resource omitting the first OFDM symbol configured as the DL symbol or as flexible, wherein the PUSCH repetition transmission comprises one or more repetitions to be transmitted in respective one or more TOs of the K TOs, and the one or more repetitions comprises an initial transmission of the PUSCH repetition transmission and at least one retransmission of the initial transmission.

20. The non-transitory computer readable storage medium of claim 19, wherein the first OFDM symbol is semi-statically configured for a DL transmission.

* * * * *